(12) United States Patent
Warren et al.

(10) Patent No.: US 11,909,150 B1
(45) Date of Patent: Feb. 20, 2024

(54) ROBUST IMPEDANCE CONTROLLED SLIP RINGS

(71) Applicant: SeeScan, Inc., San Diego, CA (US)

(72) Inventors: Alexander L. Warren, Escondido, CA (US); Mark S. Olsson, La Jolla, CA (US); Nicholas A. Smith, Chula Vista, CA (US)

(73) Assignee: SeeScan, Inc., San Diego, CA (US)

( * ) Notice: Subject to any disclaimer, the term of this patent is extended or adjusted under 35 U.S.C. 154(b) by 72 days.

(21) Appl. No.: 17/853,505

(22) Filed: Jun. 29, 2022

Related U.S. Application Data

(63) Continuation of application No. 16/676,292, filed on Nov. 6, 2019, now Pat. No. 11,404,837.

(60) Provisional application No. 62/756,538, filed on Nov. 6, 2018.

(51) Int. Cl.
  *H01R 39/08* (2006.01)
  *H02K 13/00* (2006.01)
  *H01R 39/34* (2006.01)

(52) U.S. Cl.
  CPC ........... *H01R 39/08* (2013.01); *H02K 13/003* (2013.01); *H01R 39/34* (2013.01)

(58) Field of Classification Search
  CPC ....... H01R 39/08; H01R 39/34; H02K 13/003
  USPC .......................................................... 310/232
  See application file for complete search history.

(56) References Cited

U.S. PATENT DOCUMENTS

| | | | | |
|---|---|---|---|---|
| 11,404,837 | B1* | 8/2022 | Warren | H01R 39/64 |
| 2003/0054672 | A1* | 3/2003 | Dollhofer | H01R 39/24 |
| | | | | 439/13 |
| 2004/0169434 | A1* | 9/2004 | Washington | H01R 39/24 |
| | | | | 310/232 |
| 2010/0075512 | A1* | 3/2010 | Lai | H01R 39/64 |
| | | | | 439/66 |
| 2011/0182080 | A1* | 7/2011 | Michelotti | B60Q 1/326 |
| | | | | 29/401.1 |
| 2013/0195466 | A1* | 8/2013 | Nakamura | H04B 10/25 |
| | | | | 398/115 |
| 2015/0263469 | A1* | 9/2015 | Olsson | H04N 23/63 |
| | | | | 348/82 |
| 2019/0000468 | A1* | 1/2019 | Adams | C23C 14/3464 |

* cited by examiner

*Primary Examiner* — Ahmed Elnakib
(74) *Attorney, Agent, or Firm* — Steven C. Tietsworth, Esq.; Michael J. Pennington, Esq.

(57) ABSTRACT

A slip ring for transferring electrical signals between rotating and static elements of a device includes a rotating element, a static element, an electrical contact assembly, including a plurality of subassemblies, contacting the rotating element and static element, one subassembly including a deformable PCB, and a spring element positioned to supply an axially aligned force to a face of the PCB to facilitate electrical contact between the PCB and other electrical contacts elements on another subassembly.

20 Claims, 16 Drawing Sheets

ROBUST IMPEDANCE CONTROLLED SLIP RINGS

FIELD

This disclosure relates generally to slip rings used in transferring electrical power and/or signals between rotating and static elements. More specifically, but not exclusively, the disclosure relates to robust and low cost impedance controlled slip rings for providing low contact noise electrical signals between rotating and static elements in video pipe inspection systems.

BACKGROUND

Slip rings are used to communicate electrical data and/or power signals between a rotating and a static element. Typical slip rings generally include a number of brushes, pins, or like electrical contact components on one element that are positioned to make electrical contact with corresponding contacts on the other element. The rotating and static elements may align along a common axis such that when the rotating element rotates relative to the static element, the associated electrical contacting components/traces remain aligned and in electrical contact. Some such slip rings, such as pancake style slip rings, are optimized to allow a user to readily connect and disconnect the rotating and static elements, whereas other slip ring types are designed to not be user separable.

In some applications a slip ring, particularly those designed to readily connect and disconnect the rotating and static elements, may be configured for enhanced robustness for use in wet, dirty, and/or otherwise harsh environments. For instance, in video pipe inspection systems, slip rings have been used in a rotatable drum reel that dispenses a semi-rigid video push-cable having an attached camera head that is pushed down a pipe. The rotatable drum reel may have a rotating element to pay out or draw in the attached push cable as well as a static element which may be or may be attached to a camera control unit (CCU) or other visual display element. The CCU or other display element may remain stationary relative to the rotating element of the drum reel. Such video pipe inspection systems may often be used in wet and dirty environments requiring enhanced robustness of component parts including slip rings. Typical slip rings use a quantity of expensive silver graphite pins that are spring loaded on one element, with the pins pressing into contact areas on the other slip ring element. Often the slip ring will use redundant pins to ensure contact onto each contact area, thus increasing the cost to produce the slip ring.

In these slip ring embodiments, the quantity of spring loaded pins may contribute to cross-talk, thus failing to control for impedance of communicated signals. With the shift towards high resolution imagers used in camera heads of pipe inspection systems, high speed, high bandwidth signals may be generated and communicated between the camera head (via the push cable) and CCU. In these pipe inspection systems, additional attention must be paid to electrical properties such as impedance to provide quality signals.

Other slip rings known in the art use other techniques for controlling impedance, but fail in robustness necessary to survive harsh, dirty, and/or wet environments. Further, such slip rings are generally either expensive to produce or not the pancake type slip ring optimized to readily connect and disconnect elements such as connecting and disconnecting a CCU to a rotating drum reel mechanism.

Accordingly, there is a need in the art to address the above-described as well as other problems in the art.

SUMMARY

This disclosure relates generally to slip rings used in transferring electrical power and/or signals between rotating and static elements. More specifically, but not exclusively, the disclosure relates to robust and low cost impedance controlled slip rings for providing low contact noise electrical signals between rotating and static elements in video pipe inspection systems.

For example, in accordance with aspects of this disclosure, one slip ring embodiment includes a rotating element and a static element. The slip ring further includes an electrical contact subassembly comprising axially aligned electrical contact subassemblies wherein one electrical contact subassembly is included in the rotating element and another electrical contact subassembly is included in the static element. At least one electrical contact subassembly includes a deformable printed circuit board (PCB). Each electrical contact subassembly includes electrical contact features axially aligned to make contact with electrical contact features on the other electrical contact subassembly and remain in contact upon rotations of the rotating element. The PCB includes an elastically deformable section surrounding the center contact area allowing the PCB to deform in an axial direction towards the other subassembly when a force is applied centrally to one face of the center contact area. Such a force may be supplied by a spring element wherein the spring element is configured to supply an outward force centrally at one face of the PCB to deform the PCB and press the electrical contacts of the electrical contact subassemblies together and establish and maintain electrical contact during rotations of the rotating element relative to the static element.

In accordance with other aspects of this disclosure, another slip ring embodiment includes a rotating element and a static element. The slip ring further includes an electrical contact subassembly comprising axially aligned electrical contact subassemblies wherein one electrical contact subassembly is included in the rotating element and another electrical contact subassembly is included in the static element. In assembly, electrical contact features on each subassembly are in electrical contact to communicate signals between the rotating element and static element and held pressed together via a spring element. The spring element is configured to supply an outward force to at least one element containing the electrical contact features and to press the electrical contact subassembly with the spring element into the other electrical contact subassembly establishing electrical contact and maintaining electrical contact during rotations of the rotating element relative to the static element. The slip ring embodiment further includes an aligning element to restrict lateral travel of the element containing the electrical contact features of the electrical contact subassembly having a spring element to ensure axial alignment to electrical contact features on the other electrical contact subassembly. A wiring connector communicates signals to and from electric contacts of the electrical contact subassembly having a spring element.

Various additional aspects, features, functions, and details of slip ring and associated device and system embodiments are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1A:
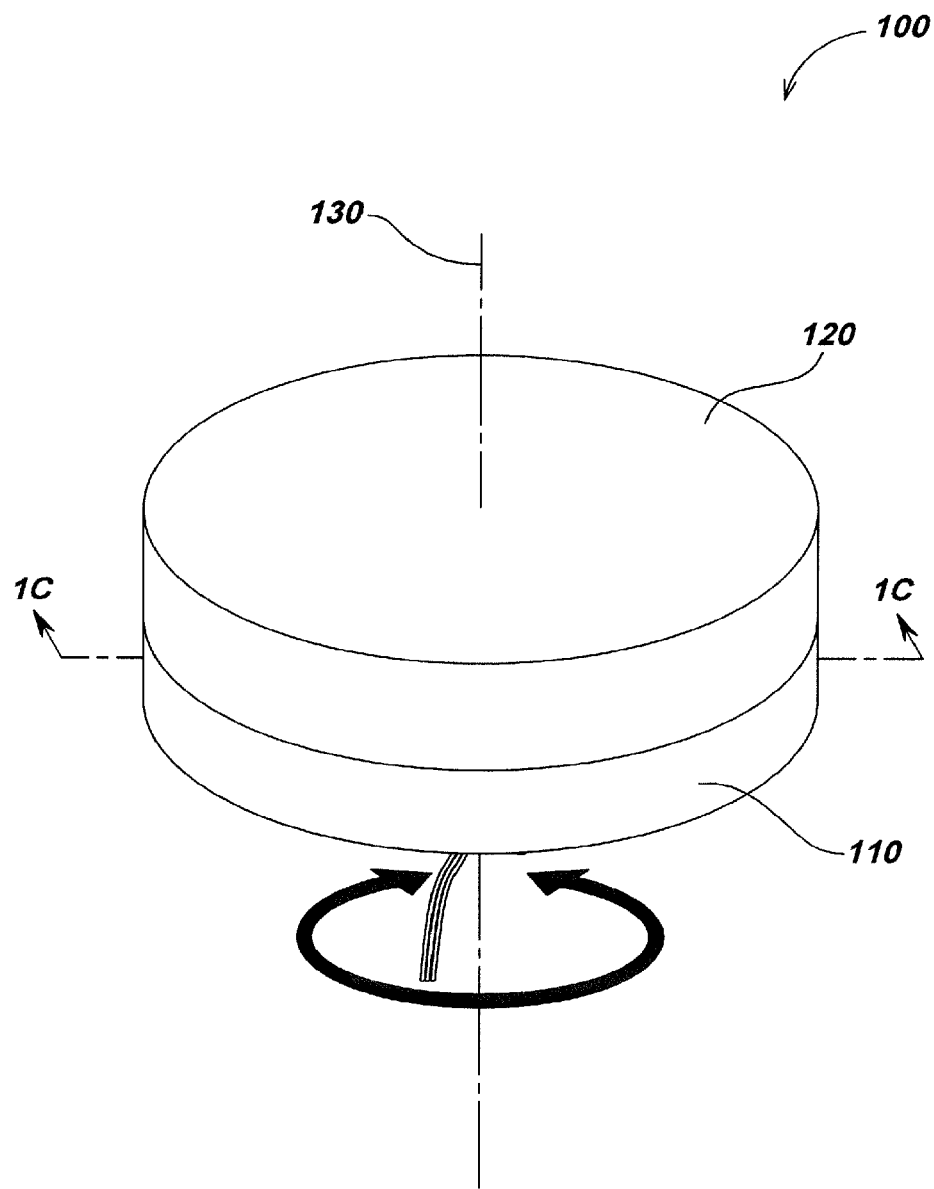
FIG. 1A is a slip ring embodiment in accordance with aspects of the present disclosure.

Various details of drum reels and pipe inspection system that may include slip rings in accordance with aspects of the present disclosure and associated systems and devices that may be used in additional device or system embodiments in combination with aspects and details of the disclosures herein are described in co-assigned patents and patent applications including: U.S. Pat. No. 6,545,704, issued Apr. 7, 1999, entitled VIDEO PIPE INSPECTION DISTANCE MEASURING SYSTEM; U.S. Pat. No. 5,939,679, issued Aug. 17, 1999, entitled VIDEO PUSH CABLE; U.S. Pat. No. 6,831,679, issued Dec. 14, 2004, entitled VIDEO CAMERA HEAD WITH THERMAL FEEDBACK LIGHTING CONTROL; U.S. Pat. No. 6,862,945, issued Mar. 8, 2005, entitled CAMERA GUIDE FOR VIDEO PIPE INSPECTION SYSTEM; U.S. Pat. No. 6,908,310, issued Jun. 21, 2005, entitled SLIP RING ASSEMBLY WITH INTEGRAL POSITION ENCODER; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. patent application Ser. No. 12/704,808, filed Feb. 12, 2010, entitled PIPE INSPECTION SYSTEM WITH REPLACEABLE CABLE STORAGE DRUM; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER A PAIR OF UPWARDLY OPENING POCKETS AND HELICAL COIL TYPE ELECTRICAL CORDS; U.S. Pat. No. 7,863,885, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,969,419, issued Jun. 28, 2011, entitled PRE-AMPLI- FIER AND MIXER CIRCUITRY FOR A LOCATOR ANTENNA; U.S. patent application Ser. No. 13/189,844, filed Jul. 25, 2011, entitled BURIED OBJECT LOCATOR SYSTEMS AND METHODS; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. patent application Ser. No. 13/346,668, Jan. 9, 2012, entitled PORTABLE CAMERA CONTROLLER PLATFORM FOR USE WITH PIPE INSPECTION SYSTEM; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. patent application Ser. No. 13/584,799, filed Aug. 13, 2012, entitled BURIED OBJECT LOCATOR SYSTEMS AND METHODS; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. Pat. No. 8,264,226, issued Sep. 11, 2012, entitled SYSTEMS AND METHODS FOR LOCATING BURIED PIPES AND CABLES WITH A MAN PORTABLE LOCATOR AND A TRANSMITTER IN A MESH NETWORK; U.S. patent application Ser. No. 13/647,310, filed Oct. 8, 2012, entitled PIPE INSPECTION SYSTEM APPARATUS AND METHODS; U.S. Pat. No. 8,289,385, issued Oct. 16, 2012, entitled PUSH-CABLE FOR PIPE INSPECTION SYSTEM; U.S. patent application Ser. No. 13/769,202, Feb. 15, 2013, entitled SMART PAINT STICK DEVICES AND METHODS; U.S. patent application Ser. No. 13/774,351, Feb. 22, 2013, entitled DOCKABLE TRIPODAL CAMERA CONTROL UNIT; U.S. patent application Ser. No. 13/787,711, Mar. 6, 2013, entitled DUAL SENSED LOCATING SYSTEMS AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,395,661, issued Mar. 12, 2013, entitled PIPE INSPECTION SYSTEM WITH SELECTIVE IMAGE CAPTURE; U.S. patent application Ser. No. 13/826,112, Mar. 14, 2013, entitled SYSTEMS AND METHODS INVOLVING A SMART CABLE STORAGE DRUM AND NETWORK NODE FOR TRANSMISSION OF DATA; U.S. Pat. No. 8,400,154, issued Mar. 19, 2013, entitled LOCATOR ANTENNA WITH CONDUCTIVE BOBBIN; U.S. patent application Ser. No. 13/851,951, Mar. 27, 2013, entitled DUAL ANTENNA SYSTEMS WITH VARIABLE POLARIZATION; U.S. patent application Ser. No. 13/894,038, May 14, 2013, entitled OMNI-INDUCER TRANSMITTING DEVICES AND METHODS; U.S. patent application Ser. No. 13/925,636, Jun. 24, 2013, entitled MODULAR BATTERY PACK APPARATUS, SYSTEMS, AND METHODS INCLUDING VIRAL DATA AND/OR CODE TRANSFER; U.S. patent application Ser. No. 14/027,027, Sep. 13, 2013, entitled SONDE DEVICES INCLUDING A SECTIONAL FERRITE CORE STRUCTURE; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. patent application Ser. No. 14/033,349, filed Sep. 20, 2013, entitled PIPE INSPECTION WITH SNAP ON PIPE GUIDES; U.S. Pat. No. 8,540,429, issued Sep. 24, 2013, entitled SNAP ON PIPE GUIDE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,587,648, issued Nov. 19, 2013, entitled SELF-LEVELING CAMERA HEAD; U.S. patent application Ser. No. 14/136,104, Dec. 20, 2013, entitled ROTATING CONTACT ASSEMBLIES FOR SELF-LEVELING CAMERA HEADS; U.S. patent application Ser. No. 14/148,649, Jan. 6, 2014, entitled MAPPING LOCATING SYSTEMS AND METHODS; U.S. Pat. No. 8,635,043, issued Jan. 21, 2014, entitled LOCATOR AND TRANSMITTER CALIBRATION SYSTEM; U.S. patent application Ser. No. 14/203,485, filed Mar. 10, 2014, entitled PIPE INSPECTION CABLE COUNTER AND OVERLAY MANAGEMENT SYSTEM; U.S. patent application Ser. No. 14/207,527, Mar. 12, 2014, entitled ROTATING CONTACT ASSEMBLIES FOR SELF-LEVELING CAMERA HEADS; U.S. patent application Ser. No. 14/207,502, Mar. 12, 2014, entitled GRADIENT ANTENNA COILS FOR USE IN LOCATING SYSTEMS; U.S. patent application Ser. No. 14/214,151, Mar. 14, 2014, entitled DUAL ANTENNA SYSTEMS WITH VARIABLE POLARIZATION; U.S. patent application Ser. No. 14/216,358, Mar. 17, 2014, entitled SMART CABLE STORAGE DRUM AND NETWORK NODE SYSTEM AND METHODS; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 9,703,002, issued Jul. 13, 2014, entitled UTILITY LOCATOR SYSTEMS AND METHODS; U.S. patent application Ser. No. 14/446,145, Jul. 29, 2014, entitled UTILITY LOCATING SYSTEMS WITH MOBILE BASE STATION; U.S. Pat. No. 8,841,912, issued Sep. 23, 2014, entitled PRE-AMPLIFIER AND MIXER CIRCUITRY FOR A LOCATOR ANTENNA; U.S. patent application Ser. No. 14/935,878, Nov. 7, 2014, entitled INSPECTION CAMERA DEVICES AND METHODS WITH SELECTIVELY ILLUMINATED MULTISENSOR IMAGING; U.S. patent application Ser. No. 14/557,163, Dec. 1, 2014, entitled ASSYMETRIC DRAG FORCE BEARING; U.S. Pat. No. 8,908,027, issued Dec. 9, 2014, entitled ASYMMETRIC DRAG FORCE BEARING FOR USE WITH PUSH-CABLE STORAGE DRUM; U.S. Pat. No. 8,970,211, issued Mar. 3, 2015, entitled PIPE INSPECTION CABLE COUNTER NAD OVERLAY MANAGEMENT SYSTEM; U.S. patent application Ser. No. 14/642,596, filed Mar. 9, 2015, entitled PIPE CLEARING CABLES AND APPARATUS; U.S. Pat. No. 8,984,698, issued Mar. 24, 2015, entitled LIGHT WEIGHT SEWER CABLE; U.S. patent application Ser. No. 14/709,301, filed May 11, 2015, entitled PIPE MAPPING SYSTEMS AND METHODS; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/746,590, Jun. 22, 2015, entitled THERMAL EXTRACTION ARCHITECTURES FOR CAMERA AND LIGHTING DEVICES; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. patent application Ser. No. 14/749,545, Jun. 24, 2015, entitled ADJUSTABLE VARIABLE RESOLUTION INSPECTION SYSTEMS AND METHODS; U.S. patent application Ser. No. 14/797,760, Jul. 13, 2015, entitled HAPTIC DIRECTIONAL FEEDBACK HANDLES FOR LOCATING DEVICES; U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,080,992, issued Jul. 14, 2015, entitled ADJUSTABLE VARIABLE RESOLUTION INSPECTION SYSTEMS AND METHODS; U.S. patent application Ser. No. 14/800,490, Jul. 15, 2013, entitled UTILITY LOCATOR DEVICES, SYSTEMS, AND METHODS WITH SATELLITE AND MAGNETIC FIELD SONDE ANTENNA SYSTEMS; U.S. Pat. No. 9,085,007, issued Jul. 21, 2015, entitled MARKING PAINT APPLICATOR FOR PORTABLE LOCATOR; U.S. Pat. No. 9,134,255, issued Sep. 15, 2015, entitled PIPE INSPECTION SYSTEM WITH SELECTIVE IMAGE CAPTURE; U.S. patent application Ser. No. 14/949,868, Nov. 23, 2015, entitled BURIED OBJECT LOCATORS WITH DODECAHEDRAL ANTENNA NODES; U.S. Pat. No. 9,207,350, issued Dec. 8, 2015, entitled BURIED OBJECT LOCATOR APPARATUS WITH SAFETY LIGHTING ARRAY; U.S. patent application Ser. No. 14/970,362, Dec. 15, 2015, entitled COAXIAL VIDEO PUSH-CABLES FOR USE IN INSPECTION SYSTEMS; U.S. Pat. No. 9,222,809, issued Dec. 29, 2015, entitled PORTABLE PIPE INSPECTION SYSTEMS AND APPARATUS; U.S. patent application Ser. No. 15/006,119, Jan. 26, 2016, entitled SELF-STANDING MULTI-LEG ATTACHMENT DEVICES FOR USE WITH UTILITY LOCATORS; U.S. patent application Ser. No. 15/434,056, Feb. 16, 2016, entitled BURIED UTILITY MARKER DEVICES, SYSTEMS, AND METHODS; U.S. patent application Ser. No. 15/050,267, filed Feb. 22, 2016, entitled SELF-LEVELING CAMERA HEAD; U.S. Pat. No. 9,277,105, issued Mar. 1, 2016, entitled SELF-LEVELING CAMERA HEAD; U.S. Pat. No. 9,341,740, issued May 17, 2016, entitled OPTICAL GROUND TRACKING APPARATUS, SYSTEMS, AND METHODS; U.S. patent application Ser. No. 15/187,785, Jun. 21, 2016, entitled BURIED UTILITY LOCATOR GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/225,623, Aug. 1, 2016, entitled SONDE-BASED GROUND-TRACKING APPARATUS AND METHODS; U.S. patent application Ser. No. 15/225,721, filed Aug. 1, 2016, entitled SONDES AND METHODS FOR USE WITH BURIED LINE LOCATOR SYSTEMS; U.S. Pat. No. 9,411,066, issued Aug. 9, 2016, entitled SONDES AND METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. patent application Ser. No. 15/247,503, Aug. 25, 2016, entitled LOCATING DEVICES, SYSTEMS, AND METHODS USING FREQUENCY SUITES FOR UTILITY DETECTION; U.S. Pat. No. 9,927,546, issued Aug. 29, 2016, entitled PHASE SYNCHRONIZED BURIED OBJECT LOCATOR APPARATUS, SYSTEMS, AND METHODS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/264,355, Sep. 13, 2016, entitled HIGH BANDWIDTH VIDEO PUSH-CABLES FOR PIPE INSPECTION SYSTEMS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,465,129, issued Oct. 11, 2016, entitled IMAGE-BASED MAPPING LOCATING SYSTEM; U.S. Pat. No. 9,468,954, issued Oct. 18, 2016, entitled PIPE INSPECTION SYSTEM WITH JETTER PUSH-CABLE; U.S. patent application Ser. No. 15/331,570, Oct. 21, 2016, entitled KEYED CURRENT SIGNAL UTILITY LOCATING SYSTEMS AND METHODS; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. patent application Ser. No. 15/339,766, Oct. 31, 2016, entitled GRADIENT ANTENNA COILS AND ARRAYS FOR USE IN LOCATING SYSTEMS; U.S. patent application Ser. No. 15/345,421, Nov. 7, 2016, entitled OMNI-INDUCER TRANSMITTING DEVICES AND METHODS; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. patent application Ser. No. 15/360,979, Nov. 23, 2016, entitled UTILITY LOCATING SYSTEMS, DEVICES, AND METHODS USING RADIO BROADCAST SIGNALS; U.S. patent application Ser. No. 15/369,693, Dec. 5, 2016, entitled CABLE STORAGE DRUM WITH MOVABLE CCU DOCKING APPARATUS; U.S. patent application Ser. No. 15/376,576, filed Dec. 12, 2016, entitled MAGNETIC SENSING BURIED OBJECT LOCATOR INCLUDING A CAMERA; U.S. Pat. No. 9,521,303, issued Dec. 13, 2016, entitled CABLE STORAGE DRUM WITH MOVEABLE CCU DOCKING APPARATUS; U.S. Pat. No. 9,523,788, issued Dec. 20, 2016, entitled MAGNETIC SENSING BURIED OBJECT LOCATOR INCLUDING A CAMERA; U.S. patent application Ser. No. 15/396,068, filed Dec. 30, 2016, entitled UTILITY LOCATOR TRANSMITTER APPARATUS AND METHODS; U.S. patent application Ser. No. 15/425,785, filed Feb. 6, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. patent application Ser. No. 15/457,149, Mar. 13, 2017, entitled USER INTERFACES FOR UTILITY LOCATORS; U.S. patent application Ser. No. 15/457,222, Mar. 13, 2017, entitled SYSTEMS AND METHODS FOR LOCATING BURIED OR HIDDEN OBJECTS USING SHEET CURRENT FLOW MODELS; U.S. patent application Ser. No. 15/457,897, Mar. 13, 2017, entitled UTILITY LOCATORS WITH RETRACTABLE SUPPORT STRUCTURES AND APPLICATIONS THEREOF; U.S. patent application Ser. No. 14/022,067, Mar. 21, 2017, entitled USER INTERFACES FOR UTILITY LOCATORS; U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. patent application Ser. No. 15/470,642, Mar. 27, 2017, entitled UTILITY LOCATING APPARATUS AND SYSTEMS USING MULTIPLE ANTENNA COILS; U.S. patent application Ser. No. 15/470,713, Mar. 27, 2017, entitled UTILITY LOCATORS WITH PERSONAL COMMUNICATION DEVICE USER INTERFACES; U.S. patent application Ser. No. 15/483,924, Apr. 10, 2017, entitled SYSTEMS AND METHODS FOR DATA TRANSFER USING SELF-SYNCHRONIZING QUADRATURE AMPLITUDE MODULATION (QAM); U.S. patent application Ser. No. 15/485,082, Apr. 11, 2017, entitled MAGNETIC UTILITY LOCATOR DEVICES AND METHODS; U.S. patent application Ser. No. 15/485,125, Apr. 11, 2017, entitled INDUCTIVE CLAMP DEVICES, SYSTEMS, AND METHODS; U.S. Pat. No. 9,625,602, issued Apr. 18, 2017, entitled SMART PERSONAL COMMUNICATION DEVICES AS USER INTERFACES; U.S. patent application Ser. No. 15/497,040, Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,632,199, issued Apr. 25, 2017, entitled INDUCTIVE CLAMP DEVICES, SYSTEMS, AND METHODS; U.S. Pat. No. 9,632,202, issued Apr. 25, 2017, entitled ECONOMICAL MAGNETIC LOCATOR APPARATUS AND METHOD; U.S. Pat. No. 9,634,878, issued Apr. 25, 2017, entitled SYSTEMS AND METHODS FOR DATA SYNCHRONIZING QUADRATURE AMPLITUDE MODULATION (QAM); U.S. Pat. No. 9,638,824, issued May 2, 2017, entitled QUAD-GRADIENT COILS FOR USE IN LOCATING SYSTEMS; U.S. patent application Ser. No. 15/590,964, May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. patent application Ser. No. 15/623,174, Jun. 14, 2017, entitled TRACKABLE DIPOLE DEVICES, METHODS, AND SYSTEMS FOR USE WITH MARKING PAINT STICKS; U.S. patent application Ser. No. 15/185,018, Jun. 17, 2016, entitled RESILIENTLY DEFORMABLE MAGNETIC FIELD TRANSMITTER CORES FOR USE WITH UTILITY LOCATING DEVICES AND SYSTEMS; U.S. patent application Ser. No. 15/626,399, Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT METHODS AND APPARATUS USING MULTIPLE ELECTROMAGNETIC SIGNALS; U.S. Pat. No. 9,696,448, issued Jul. 4, 2017, entitled GROUND-TRACKING DEVICES FOR USE WITH A MAPPING LOCATOR; U.S. patent application Ser. No. 15/670,845, Aug. 7, 2017, entitled HIGH FREQUENCY AC-POWERED DRAIN CLEANING AND INSPECTION APPARATUS AND METHODS; U.S. patent application Ser. No. 15/681,250, Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE AND CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. patent application Ser. No. 15/701,247, Sep. 11, 2017, entitled PIPE INSPECTION SYSTEMS WITH SELF-GROUNDING PORTABLE CAMERA CONTROLLER; U.S. Pat. No. 9,769,366, issued Sep. 19, 2017, entitled SELF-GROUNDING TRANSMITTING PORTABLE CAMERA CONTROLLER FOR USE WITH PIPE INSPECTION SYSTEMS; U.S. Provisional Patent Application 62/564,215, Sep. 27, 2017, entitled MULTIFUNCTION BURIED UTILITY LOCATING CLIPS; U.S. patent application Ser. No. 15/728,250, Oct. 9, 2017, entitled OPTICAL GROUND TRACKING APPARATUS, SYSTEMS, AND METHODS FOR USE WITH BURIED UTILITY LOCATORS; U.S. patent application Ser. No. 15/728,410, Oct. 9, 2017, entitled PIPE INSPECTION SYSTEM WITH JETTER PUSH-CABLE; U.S. Pat. No. 9,784,837, issued Oct. 10, 2017, entitled OPTICAL GROUND TRACKING APPARATUS, SYSTEMS, AND METHODS; U.S. patent application Ser. No. 15/785,330, Oct. 16, 2017, entitled SYSTEMS AND METHODS OF USING A SONDE DEVICE WITH A SECTIONAL FERRITE CORE STRUCTURE; U.S. Pat. No. 9,791,382, issued Oct. 17, 2017, entitled PIPE INSPECTION SYSTEM WITH JETTER PUSH-CABLE; U.S. Pat. No. 9,798,033, issued Oct. 24, 2017, entitled SONDE DEVICES INCLUDING A SECTIONAL FERRITE CORE; U.S. patent application Ser. No. 15/805,007, filed Nov. 6, 2017, entitled PIPE INSPECTION SYSTEM CAMERA HEADS; U.S. patent application Ser. No. 15/806,219, Nov. 7, 2017, entitled MULTI-CAMERA PIPE INSPECTION APPARATUS, SYSTEMS AND METHODS; U.S. Provisional Patent Application 62/580,386, Nov. 1, 2017, entitled THREE AXIS MEASUREMENT MODULES AND SENSING METHODS; U.S. patent application Ser. No. 15/811,264, Nov. 13, 2017, entitled SPRING ASSEMBLIES WITH VARIABLE FLEXIBILITY FOR USE WITH PUSH-CABLES AND PIPE INSPECTION SYSTEMS; U.S. patent application Ser. No. 15/811,361, Nov. 13, 2017, entitled OPTICAL GROUND TRACKING APPARATUS, SYSTEMS, AND METHODS; U.S. Pat. No. 9,824,433, issued Nov. 21, 2017, entitled PIPE INSPECTION SYSTEM CAMERA HEADS; U.S. Pat. No. 9,829,783, issued Nov. 28, 2017, entitled SPRING ASSEMBLIES WITH VARIABLE FLEXIBILITY FOR USE WITH PUSH-CABLES AND PIPE INSPECTION SYSTEMS; U.S. Pat. No. 9,835,564, issued Dec. 5, 2017, entitled MULTI-CAMERA PIPE INSPECTION APPARATUS, SYSTEMS, AND METHODS; U.S. Pat. No. 9,841,503, issued Dec. 12, 2017, entitled OPTICAL GROUND TRACKING APPARATUS, SYSTEMS, AND METHODS; U.S. patent application Ser. No. 15/846,102, Dec. 18, 2017, entitled SYSTEMS AND METHODS FOR ELECTRONICALLY MARKING, LOCATING, AND VIRTUALLY DISPLAYING BURIED UTILITIES; U.S. patent application Ser. No. 15/866,360, Jan. 9, 2018, entitled TRACKED DISTANCE MEASURING DEVICE, SYSTEMS, AND METHODS; U.S. patent application Ser. No. 15/870,787, Jan. 12, 2018, entitled MAGNETIC FIELD CANCELING AUDIO SPEAKERS FOR USE WITH BURIED UTILITY LOCATORS OR OTHER DEVICES; U.S. Provisional Patent Application 62/620,959, Jan. 23, 2018, entitled RECHARGEABLE BATTERY PACK ONBOARD CHARGE STATE INDICATION METHODS AND APPARATUS; U.S. Pat. No. 9,880,309, issued Jan. 30, 2018, entitled UTILITY LOCATOR TRANSMITTER APPARATUS AND METHODS; U.S. patent application Ser. No. 15/889,067, Feb. 5, 2018, entitled UTILITY LOCATOR TRANSMITTER DEVICES, SYSTEMS, AND METHODS WITH DOCKABLE APPARATUS; U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. patent application Ser. No. 15/919,077, Mar. 12, 2018, entitled PORTABLE PIPE INSPECTION SYSTEMS AND METHODS; U.S. Pat. No. 9,914,157, issued Mar. 13, 2018, entitled METH- ODS AND APPARATUS FOR CLEARING OBSTRUCTIONS WITH A JETTER PUSH-CABLE APPARATUS; U.S. patent application Ser. No. 15/922,703, Mar. 15, 2018, entitled SELF-LEVELING INSPECTION SYSTEMS AND METHODS; U.S. patent application Ser. No. 15/925,643, Mar. 19, 2018, entitled PHASE-SYNCHRONIZED BURIED OBJECT TRANSMITTER AND LOCATOR METHODS AND APPARATUS; U.S. patent application Ser. No. 15/925,671, Mar. 19, 2018, entitled MULTI-FREQUENCY LOCATING SYSTEMS AND METHODS; U.S. Pat. No. 9,924,139, issued Mar. 20, 2018, entitled PORTABLE PIPE INSPECTION SYSTEMS AND APPARATUS; U.S. patent application Ser. No. 15/936,250, Mar. 26, 2018, entitled GROUND TRACKING APPARATUS, SYSTEMS, AND METHODS; U.S. Pat. No. 9,927,368, issued Mar. 27, 2018, entitled SELF-LEVELING INSPECTION SYSTEMS AND METHODS; U.S. Pat. No. 9,927,545, issued Mar. 27, 2018, entitled MULTI-FREQUENCY LOCATING SYSTEM AND METHODS; U.S. Pat. No. 9,928,613, issued Mar. 27, 2018, entitled GROUND TRACKING APPARATUS, SYSTEMS, AND METHODS; U.S. Provisional Patent Application 62/656,259, Apr. 11, 2018, entitled GEOGRAPHIC MAP UPDATING METHODS AND SYSTEMS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. patent application Ser. No. 15/960,340, Apr. 23, 2018, entitled METHODS AND SYSTEMS FOR GENERATING INTERACTIVE MAPPING DISPLAYS IN CONJUNCTION WITH USER INTERFACE DEVICES; and U.S. Pat. No. 9,959,641, issued May 1, 2018, entitled METHODS AND SYSTEMS FOR SEAMLESS TRANSITIONING IN INTERACTIVE MAPPING SYSTEMS. The content of each of the above-described patents and applications is incorporated by reference herein in its entirety. The above-described patent applications and patents may be referred to herein collectively as the "incorporated applications."

In accordance with various aspects of this disclosure, one slip ring embodiment includes a rotating element and a static element. The slip ring further includes an electrical contact subassembly comprising axially aligned electrical contact subassemblies wherein one electrical contact subassembly is included in the rotating element and another electrical contact subassembly is included in the static element. At least one electrical contact subassembly includes a deformable printed circuit board (PCB). Each electrical contact subassembly includes electrical contact features axially aligned to make contact with electrical contact features on the other electrical contact subassembly and to remain in contact upon rotations of the rotating element. The PCB includes an elastically deformable section surrounding the center contact area allowing the PCB to deform in an axial direction towards the other subassembly when a force is applied centrally to one face of the center contact area. Such a force may be supplied by a spring element wherein the spring element is configured to supply an outward force centrally at one face of the PCB to deform the PCB and press the electrical contacts of the electrical contact subassemblies together and establish and maintain electrical contact during rotations of the rotating element relative to the static element.

In another aspect, the deformable PCB is formed by a series of radially symmetric arc cuts through the PCB and surrounding the center contact area on the PCB, allowing the PCB to deform in an axial direction towards the other subassembly when a force is applied centrally to one face. For instance, the deformable PCB may deform into a partial conical shape wherein the central contact area may push in an axial direction towards its mating subassembly. In some such embodiments, the PCB includes impedance controlled traces traveling through the circuit board material of the radially symmetric arc cut out portion of the PCB surrounding the center contact area. In other embodiments, the slip ring may include an impedance controlled wiring connector coupled to the PCB to communicate signals.

In another aspect, the electrical contact feature of one electrical contact subassembly includes two or more conductive pins that align to contact and remain in contact in rotations with concentric contact areas on the other electrical contact subassembly. In at least one embodiment, there are three conductive pins arranged in a tripodal arrangement. The pins may be silver graphite or other conductive material. The conductive pins may have centers equidistant to that of the other two pins. The centroid of the pins may align with the center of the spring element.

In accordance with various other aspects of this disclosure, another slip ring embodiment includes a rotating element and a static element. The slip ring further includes an electrical contact subassembly comprising axially aligned electrical contact subassemblies wherein one electrical contact subassembly is included in the rotating element and another electrical contact subassembly is included in the static element. In assembly, electrical contact features on each subassembly are in electrical contact to communicate signals between the rotating element and static element and held pressed together via a spring element. The spring element is configured to supply an outward force to at least one element containing the electrical contact features and to press the electrical contact subassembly with the spring element into the other electrical contact subassembly establishing electrical contact and maintaining electrical contact during rotations of the rotating element relative to the static element. The slip ring embodiment further includes an aligning element to restrict lateral travel of the element containing the electrical contact features of the electrical contact subassembly having a spring element to ensure axial alignment to electrical contact features on the other electrical contact subassembly. A wiring connector communicates signals to and from electric contacts of the electrical contact subassembly having a spring element. The wiring connector may include impedance controlled wires.

The term "exemplary" is used herein to mean "serving as an example, instance, or illustration." Any aspect and/or embodiment described herein as "exemplary" is not necessarily to be construed as preferred or advantageous over other aspects and/or embodiments.

Example Robust, Low Cost Impedance Controlled Slip Ring Embodiments

Embodiments of slip rings in accordance with various aspects of the present disclosure may be used to communicate data signals and/or power between rotating and static elements for be used in harsh, dirty, and/or wet environments, as well as to control for electrical impedance of signals, while having enhanced robustness and low cost of production. As described herein, exemplary slip ring embodiments of the present disclosure may be employed in drum reels configured to dispense push cables for video pipe inspection systems while communicating signals to and from a connected stationary camera control unit (CCU) or like display and control module, however, the disclosures herein may be applied to a variety of other slip ring applications in alternate embodiments. In an exemplary embodiment the video inspection system communicates signals from a camera head to a CCU or other device via the push cable using digitally modulated signals such as QAM signaling. Other analog or digital signaling mechanisms may also be used. Likewise, power and/or control signals may be sent through slip rings between a CCU or other power and/or signal source and a camera head or other coupled device such as a cutting or jetting tool or other electrically powered and/or electronically signaled device. Power may be provided as either DC or, in some embodiments, as AC power. AC power may be provided at frequencies of kHz, 10s of kHz, 100s of kHz, or MHz in some embodiments.

Figure 3:
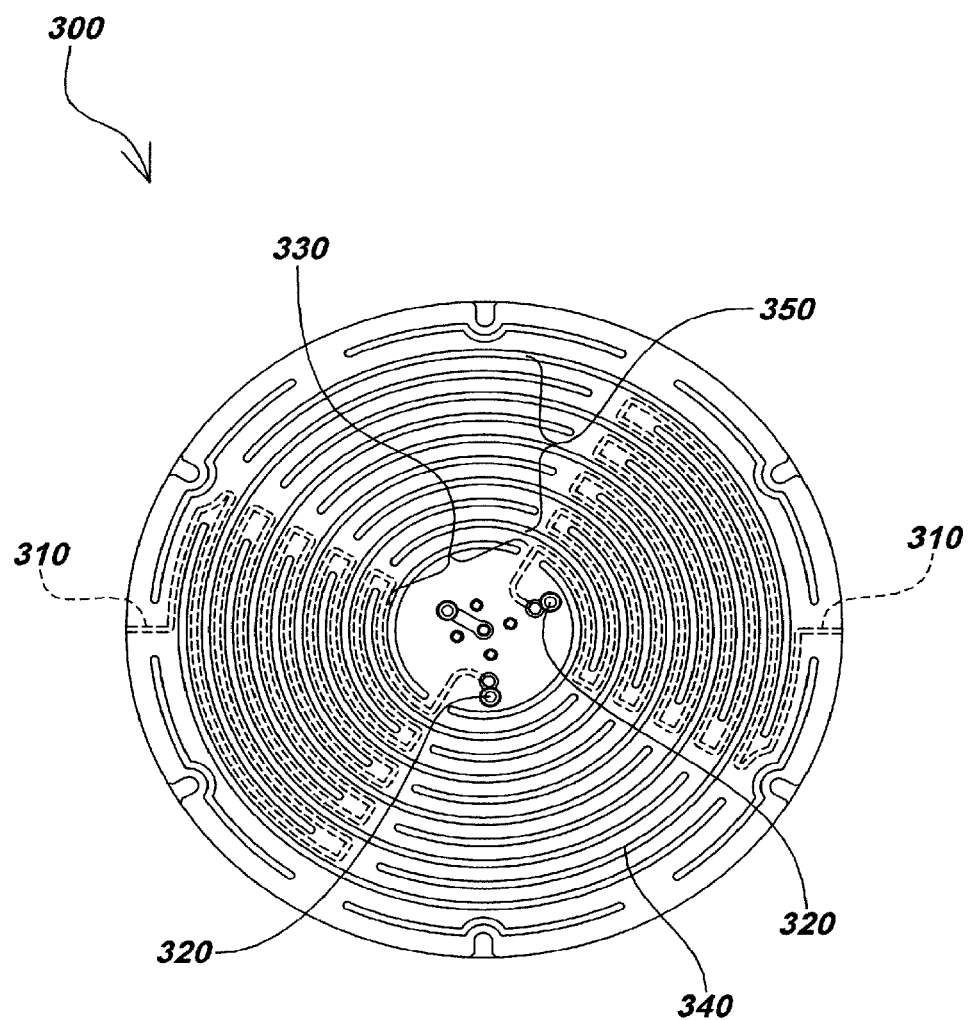
FIG. 3 is a deformable PCB embodiment.
Figure 4A:
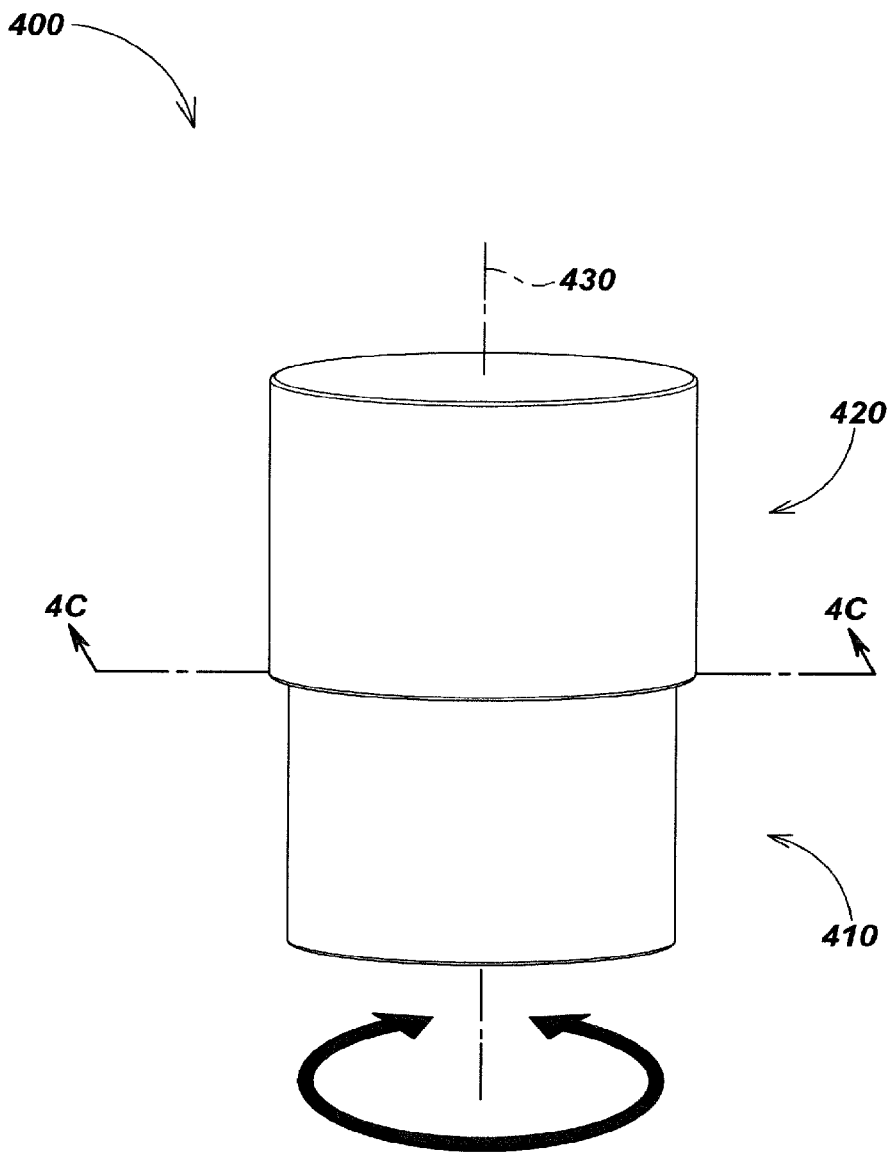
FIG. 4A is another slip ring embodiment in in accordance with aspects of the present disclosure.
Figure 4B:
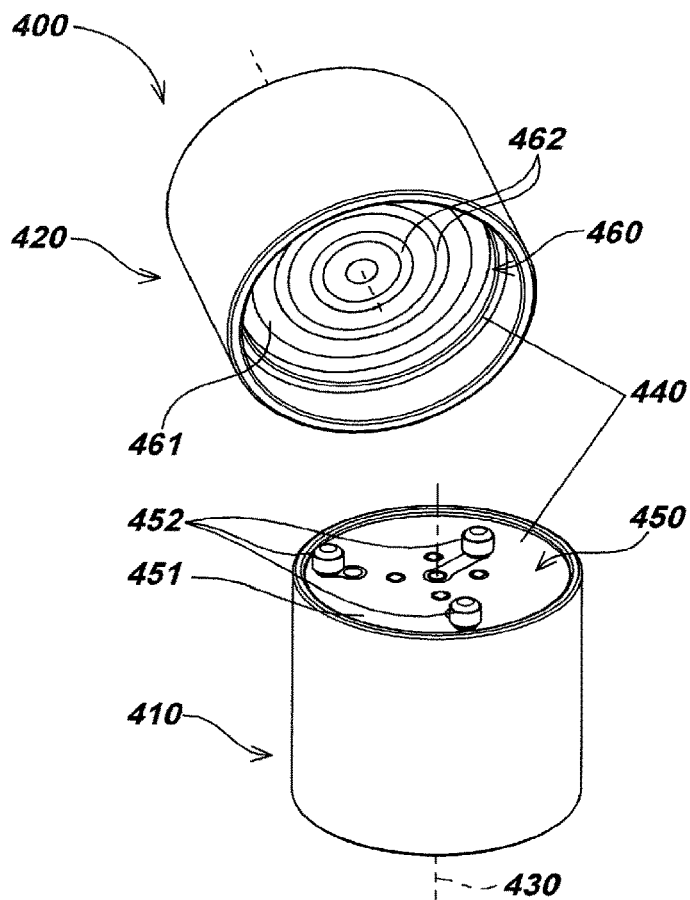
FIG. 4B is a partially exploded view of the slip ring embodiment of FIG. 4A
Figure 4C:
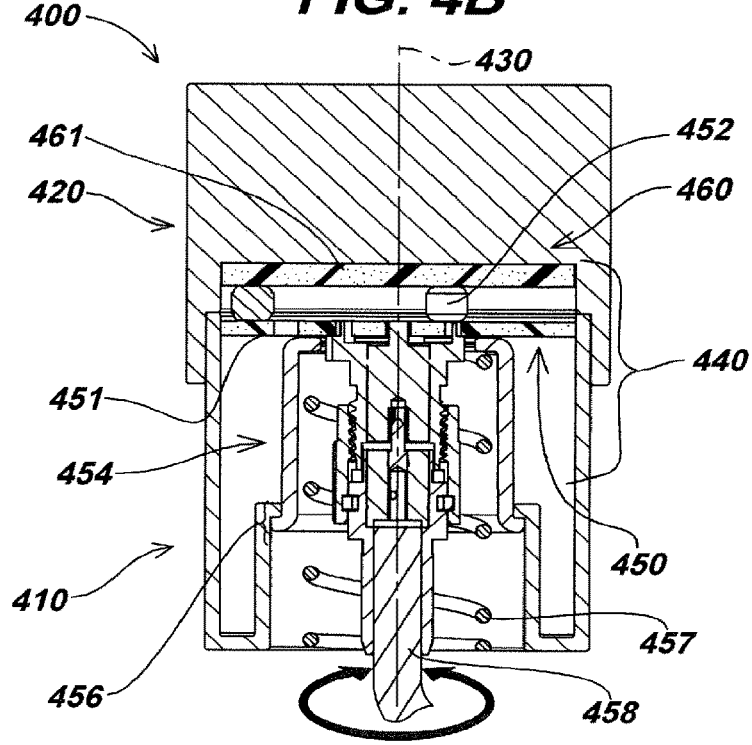
FIG. 4C is a section view of the slip ring embodiment of FIG. 4A along line 4C-4C.
Figure 5:
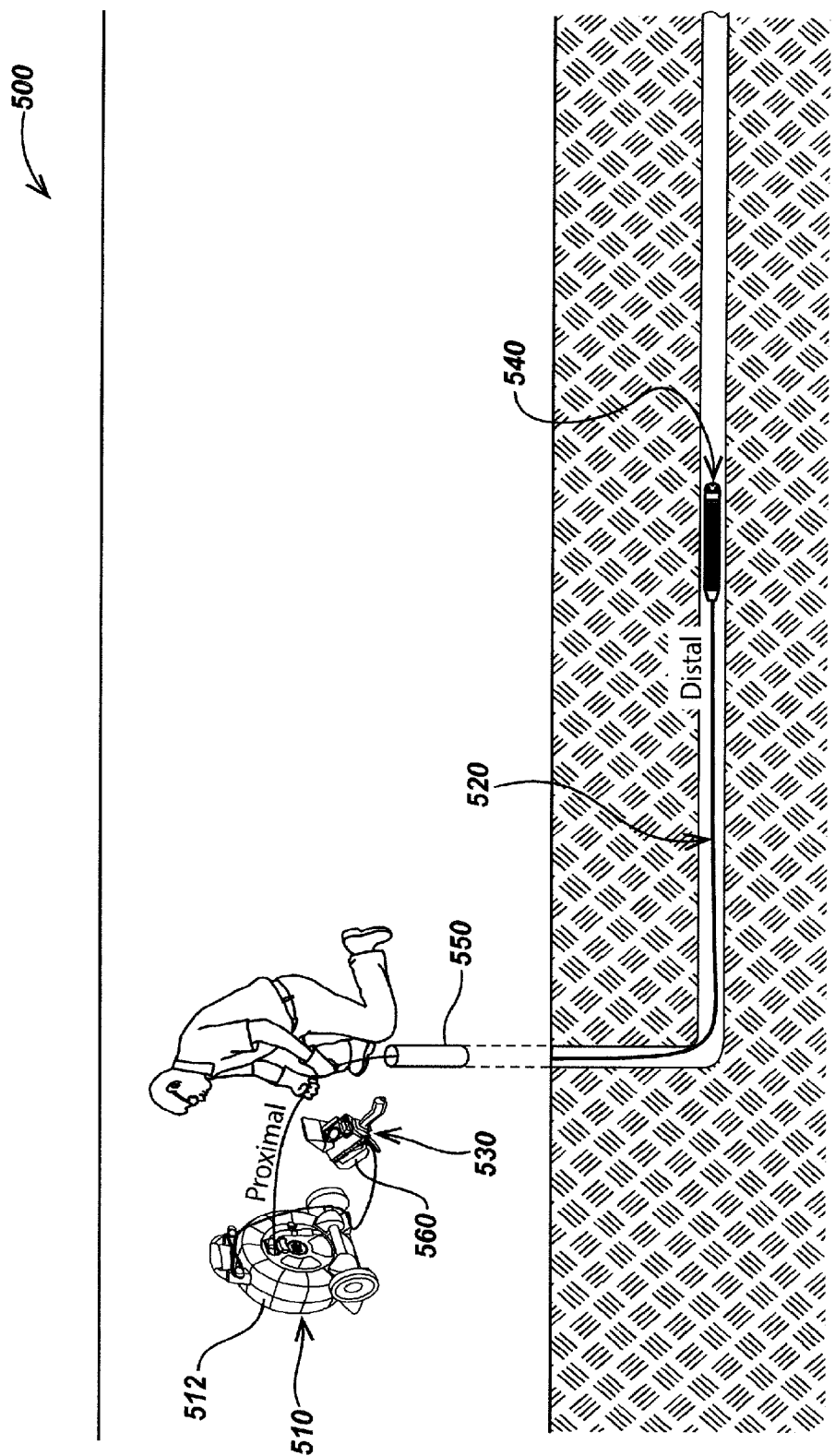
FIG. 5 is a pipe inspection system employing a slip ring embodiment inside a drum reel, in accordance with aspects of the present disclosure.
Figure 6A:
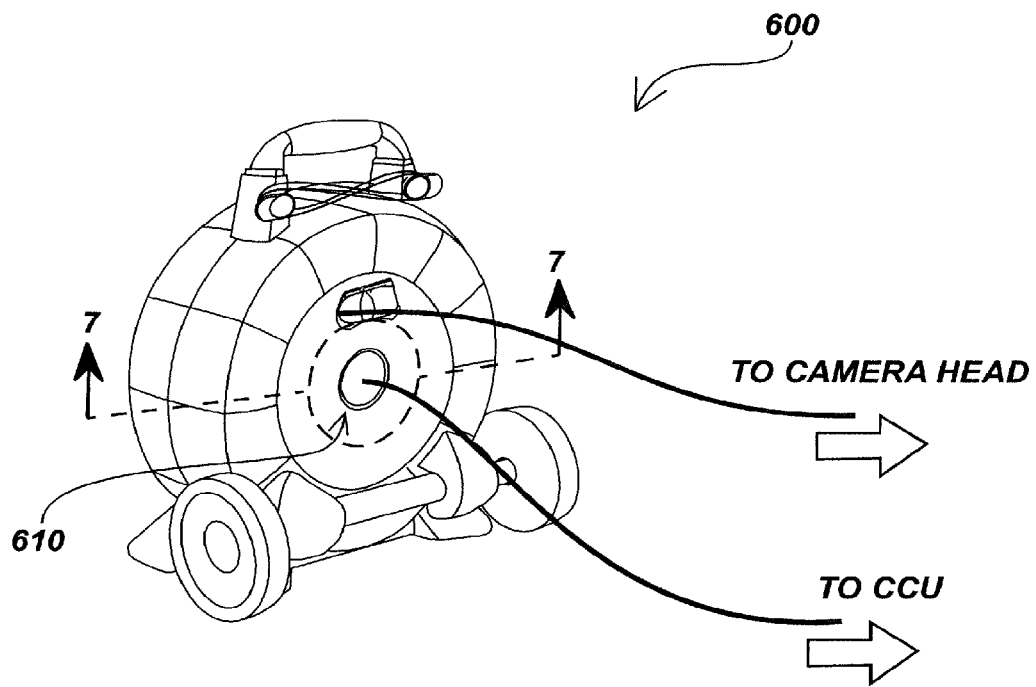
FIG. 6A is an isometric view of a drum reel employing a slip ring embodiment in accordance with aspects of the present disclosure.
Figure 6B:
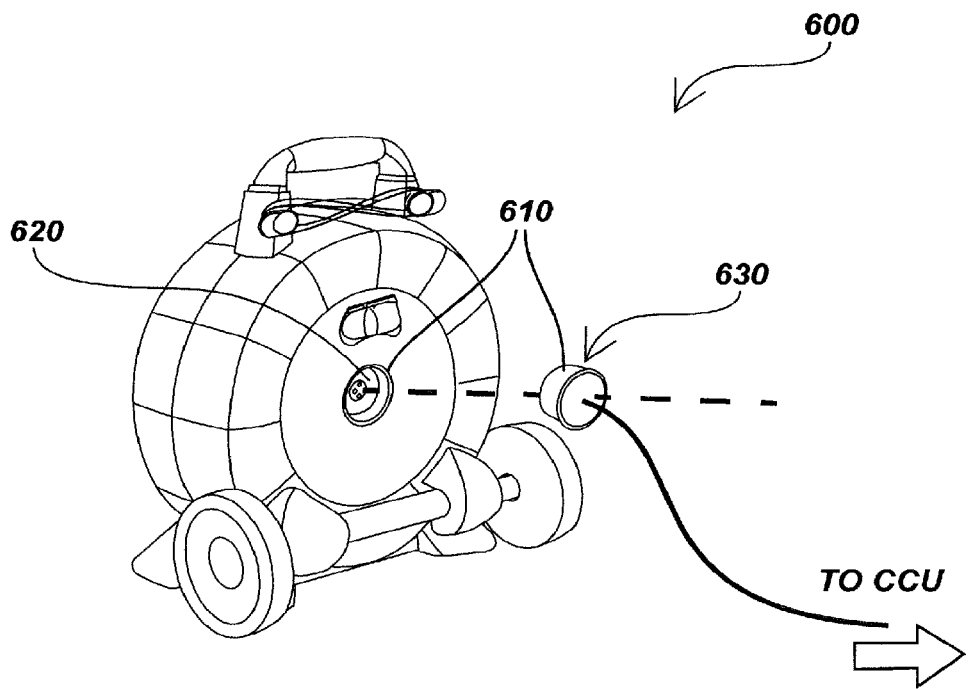
FIG. 6B is a partially exploded view of the slip ring assembly in the drum reel embodiment shown in 6A.

It should be noted that the various static and rotating elements of the slip rings described in FIGS. 1A-4C may generally secure to static and rotating portions of a device or rotating and static portions in connecting devices in which they are coupled, such as with the drum reel 510 of FIG. 5 or drum reel 600 of FIGS. 6A-6C. It should likewise be noted that a ball bearing or like element to provide free rotation of the rotating element about a shared axis to the static element may generally be disposed between the static and rotating elements and/or static and rotating portions of their associated coupled device(s).

Turning to FIG. 1A, a slip ring embodiment 100 in accordance with aspects of the present disclosure may include a rotating element 110 and a static element 120. The rotating element 110 may, in use, rotate relative to the static element 120 about a shared axis 130, while communicating electrical power and/or data signals between the rotating element 110 and static element 120.

Figure 1B:
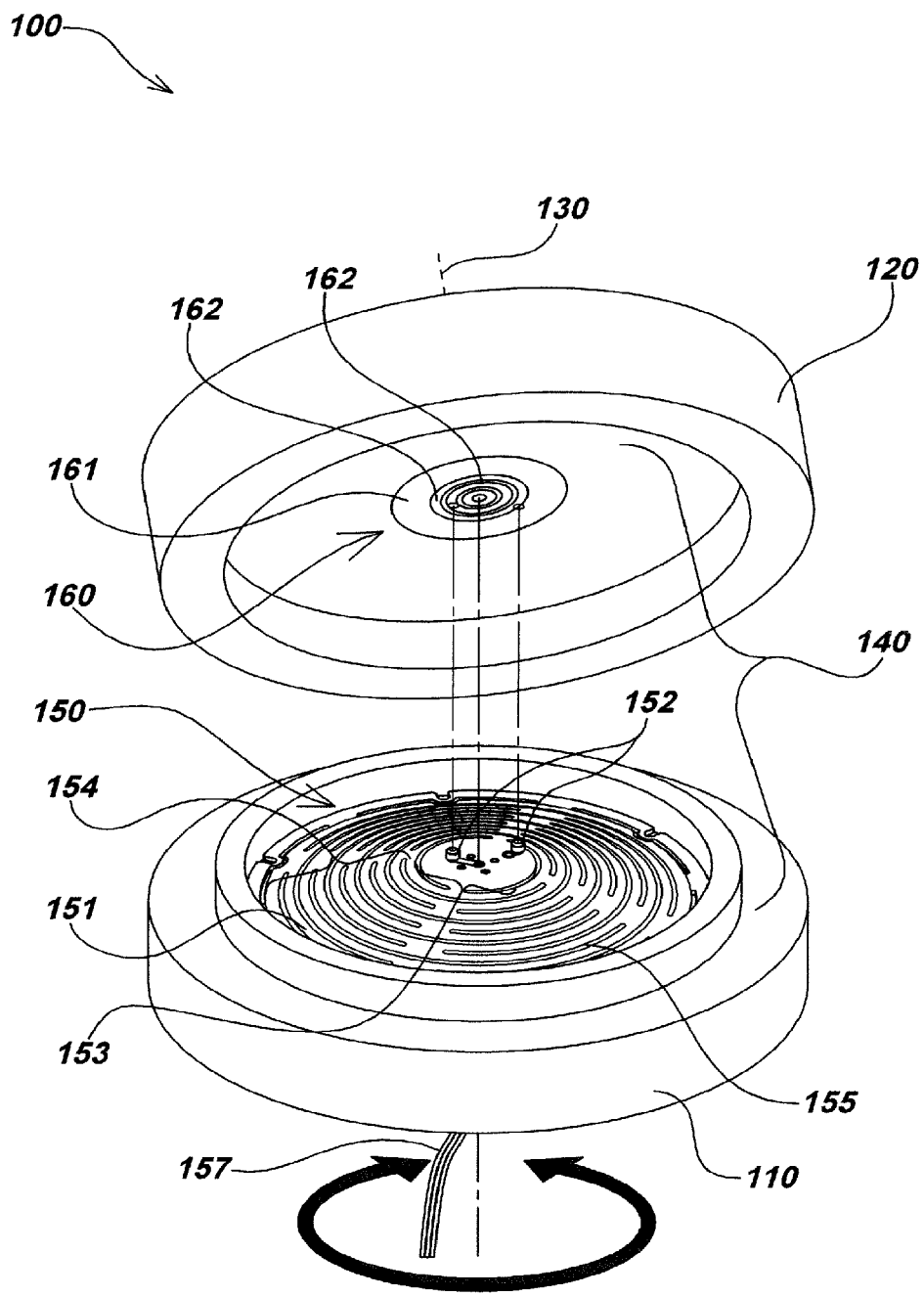
FIG. 1B is a partially exploded view of the slip ring embodiment of FIG. 1A.
Figure 1C:
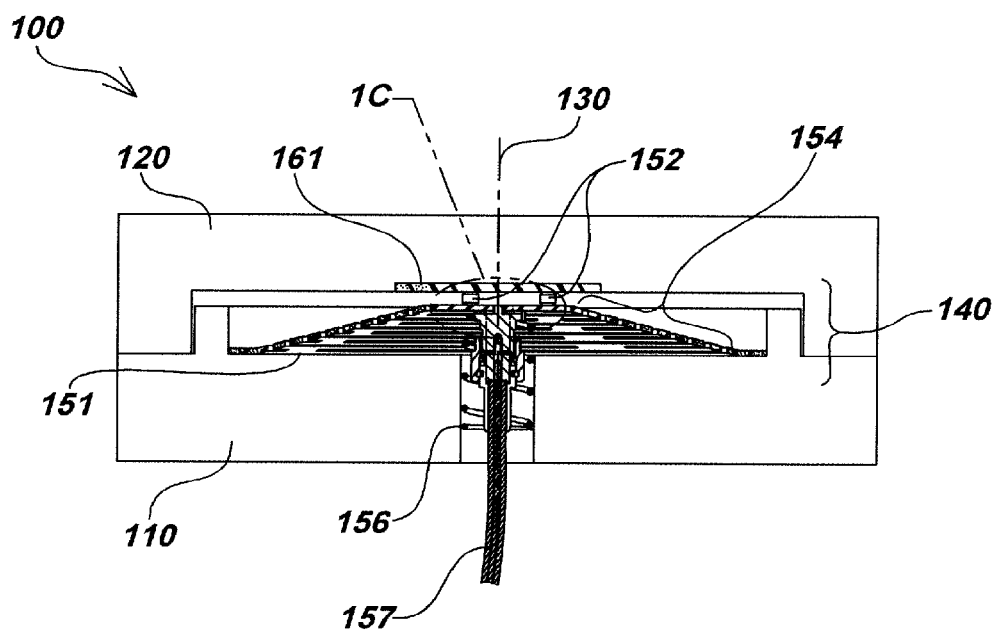
FIG. 1C is a section view of the slip ring embodiment of FIG. 1A along line 1C-1C.

Turning to FIGS. 1B and 1C, the slip ring 100 may include an electrical contact assembly 140 to communicate power and data signals between the rotating element 110 and static element 120. The electrical contact assembly 140 may include rotating or contact electrical contact subassemblies (150 and 160, respectively) wherein one electrical contact subassembly 150 is disposed in the rotating element 110 and the other electrical contact subassembly 160 is disposed in the static element 120.

Still referring to FIGS. 1B and 1C, the rotating element 110 may include a rotating electrical contact subassembly 150 having a deformable printed circuit board (PCB) 151. The deformable PCB 151 may have a number of electrical contact features 152 located in a center contact area 153. As illustrated, the electrical contact features 152 include two electrically conductive pins. In other embodiments in keeping with the present invention, the electrical contact features 152 may include two or more conductive pins, brushes, or like contact points. In some embodiments, such as slip ring embodiment 200 of FIG. 2B or slip ring assembly 610 of FIGS. 6A-7, the electrical contact features 152 may comprise three conductive pins in a tripodal arrangement. Some such pins may be silver graphite or like conductive material(s). The deformable PCB 151 may include an elastically deformable section 154 surrounding the center contact area 153 allowing the deformable PCB 151 to deform in an axial direction towards the static subassembly 120. For instance, the deformable PCB 151 may deform in a partially conical shape when a force is applied centrally to one face of the center contact area 153. The deformable section 154 of deformable PCB 151 may be formed with a series of radially symmetric arc cuts 155 (FIG. 1B) surrounding the center contact area 153. The force to deform the deformable PCB 151 of the rotating electrical contact subassembly 150 may be supplied by spring 156 (FIG. 1C) or, in other embodiments, another like spring element. A wiring connector 157 may couple to deformable PCB 151 to communicate signals to deformable PCB 151 and to electrical contact features 152 thereon. The wiring connector 157 may be impedance controlled.

Referring to FIG. 1B, the static element 120 may include static electrical contact subassembly 160 axially aligned along axis 130 and configured to mate with the rotating electrical contact subassembly 150 of the rotating element 110. The static electrical contact subassembly 160 of the static element 120 may include a PCB 161 or like substrate that may contain concentric contact areas 162.

Figure 1D:
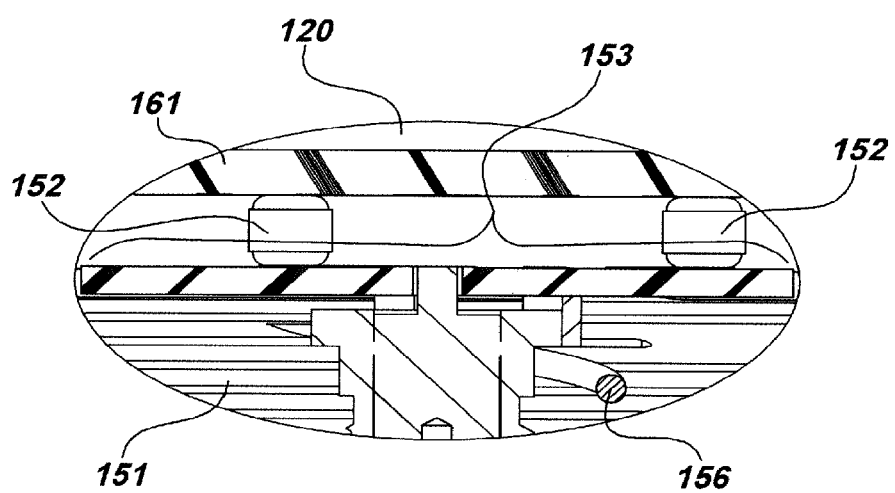
FIG. 1D is a detailed view of the contact between elements in section view of the embodiment shown in FIG. 1C.

Turning to FIGS. 1C and 1D, the different circular contacts of the concentric contact areas 162 may each, in assembly, align to and contact one of the electrical contact features 152 of the rotating electrical contact subassembly 150 disposed in rotating element 110 (FIG. 1C). The electrical contact features 152 may remain in contact with the concentric contact areas 162 during rotations of the rotating element 110 (FIG. 1C). For instance, as the rotating element 110 and static element 120 are mated together, the spring 156 in rotating contact element subassembly 150 may be pressed and held into the electrical contact features 152 connecting them to concentric contact areas 162 of the static electrical contact subassembly 160. Each pin or like contact point of the electrical contact features 152 may track along its respective circular contact of the concentric contact areas 162 during rotations of the rotating element 110, facilitating the communication of signals between the rotating element 110 and static element 120. Such signals may further be communicated to other devices or elements disposed in or connected to the static element 120 via traces on PCB 161 or wires (not illustrated) which may be impedance controlled or both.

In some embodiments, the deformable PCB and/or pins/contact points and concentric contact area of the electrical contact features may be swapped onto opposite rotating or static elements. One such slip ring embodiment 200 is illustrated in FIGS. 2A-2D.

Figure 2A:
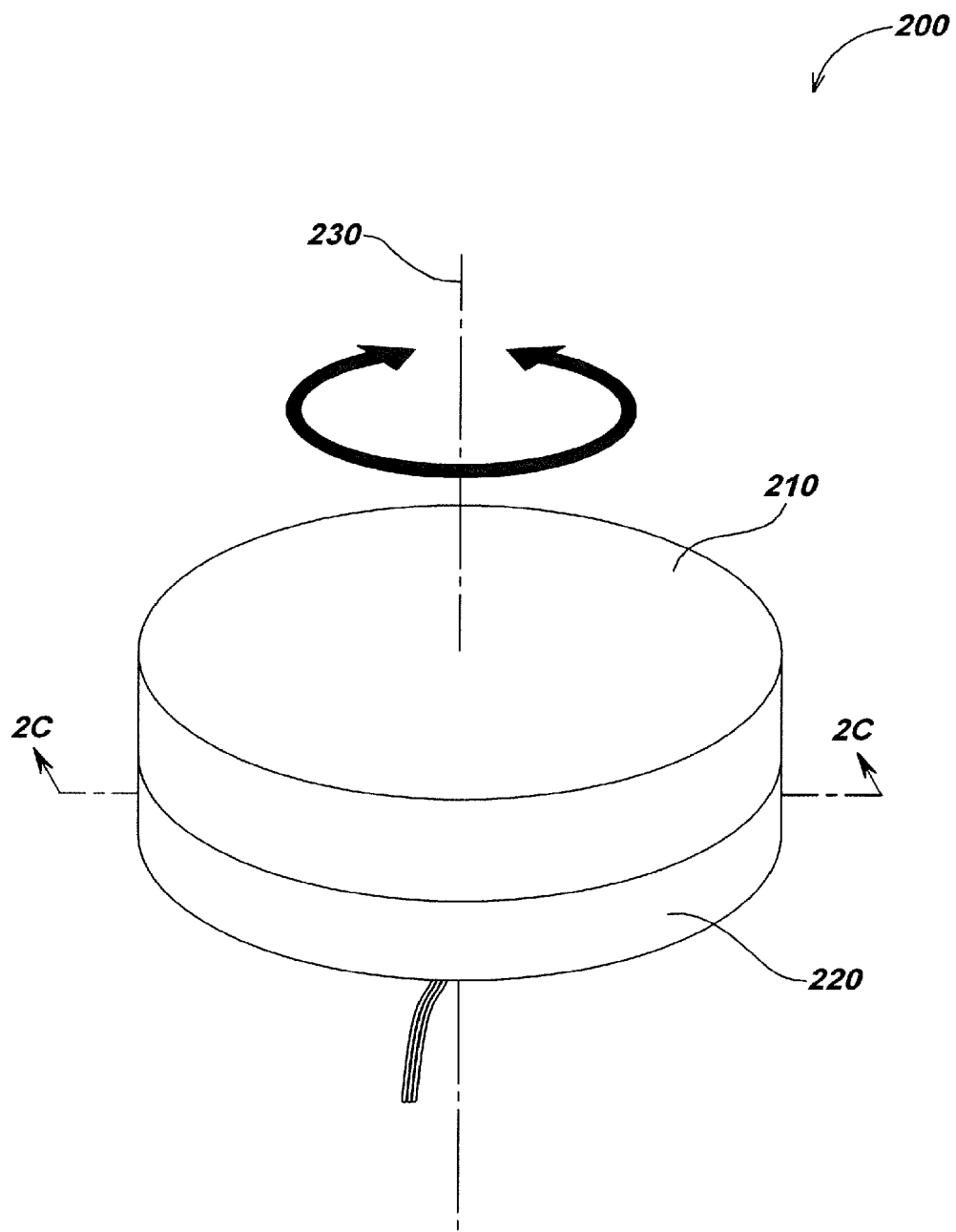
FIG. 2A is another slip ring embodiment in accordance with aspects of the present disclosure.

Turning to FIG. 2A, slip ring 200 may include a rotating element 210 and a static element 220. The rotating element 210 may, in use, rotate relative to the static element 220 about a shared axis 230 while communicating power and data signals between the rotating element 210 and static element 220.

Figure 2B:
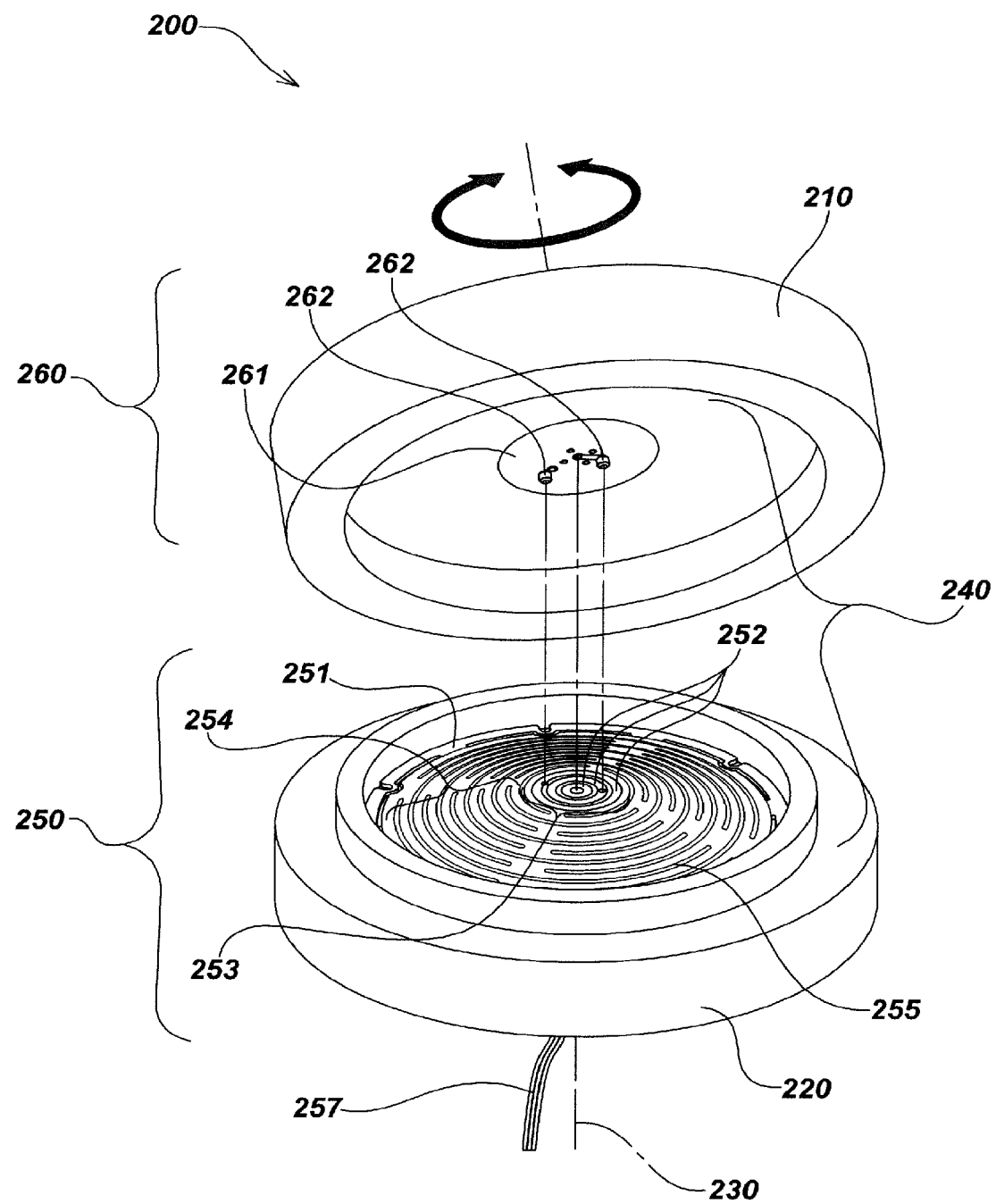
FIG. 2B is a partially exploded view of the slip ring embodiment of FIG. 2A.
Figure 2C:
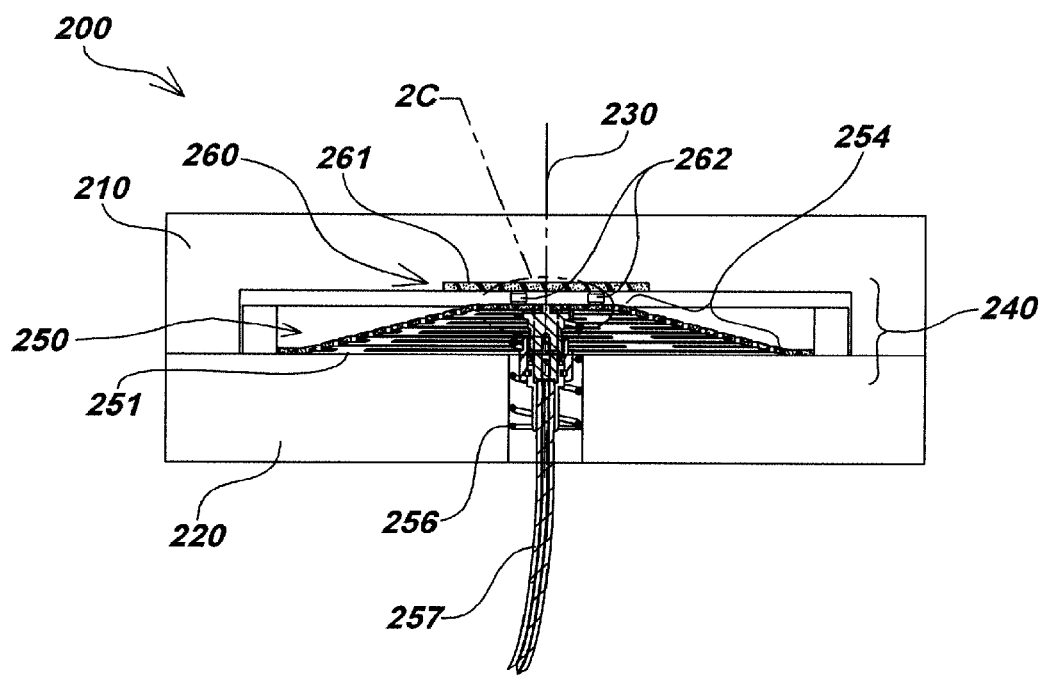
FIG. 2C is a section view of the slip ring embodiment of FIG. 2A along line 2C-2C.
Figure 7:
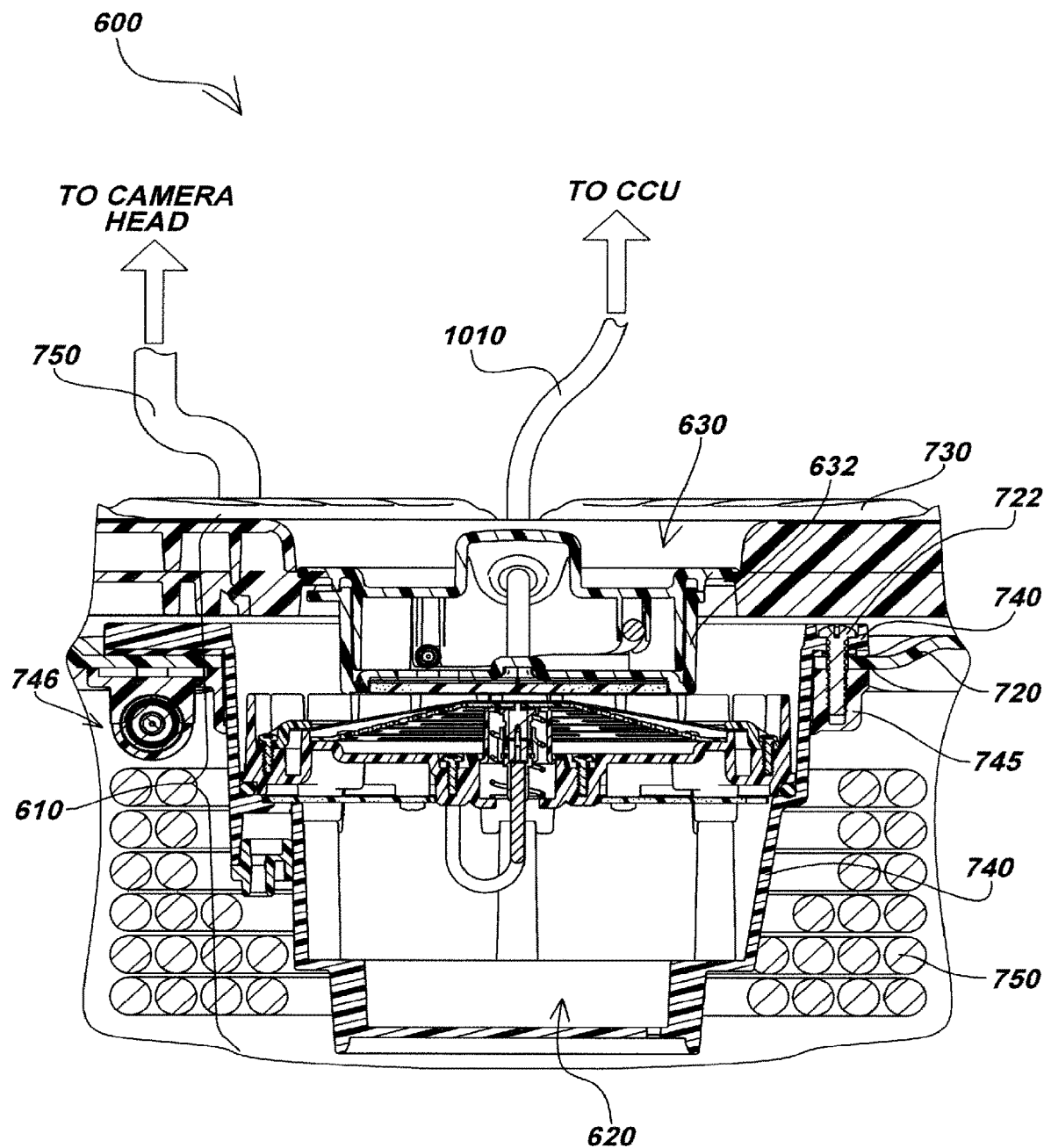
FIG. 7 is a section view detailing the slip ring assembly in the drum reel embodiment shown in FIG. 6A along line 7-7.

Turning to FIGS. 2B and 2C, the slip ring 200 may include an electrical contact assembly 240 to communicate power and data signals between the rotating element 210 and static element 220 and ultimately rotating and static devices or portions of the same device (as described with the drum reel 600 of FIGS. 6A-7). The electrical contact assembly 240 may include static and rotating electrical contact subassemblies (250 and 260) wherein a static electrical contact subassembly 250 is disposed in static element 220 and a rotating electrical contact subassembly 260 is disposed in rotating element 210.

Referring to FIG. 2B, the electrical contact subassembly 250 may have a deformable PCB 251 with a number of circular contacts comprising an electrically conductive concentric contact area 252 located in a center contact area 253. The deformable PCB 251 may include an elastically deformable section 254 surrounding the center contact area 253, allowing the deformable PCB 251 to deform in an axial direction towards the other subassembly when a force is applied centrally to one face of the center contact area 253. The deformable section 254 of deformable PCB 251 is formed by a series of radially symmetric arc cuts 255 surrounding the center contact area 253. The force to deform the PCB 251 of electrical contact subassembly 250 may be supplied by spring 256 (FIG. 2C) or, in other embodiments, another spring-like element. An impedance controlled wiring connector 257 may couple to deformable PCB 251 to communicate signals to deformable PCB 251 and to electrical contact features 252 thereon.

Figure 2D:
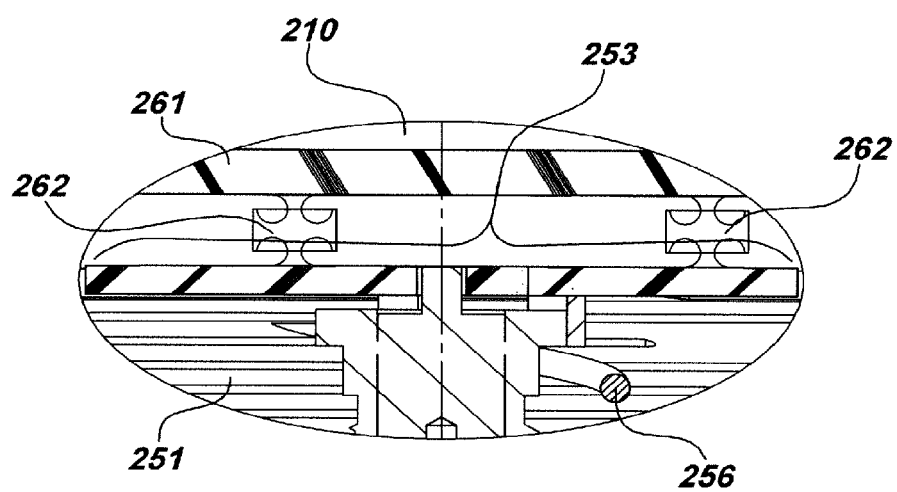
FIG. 2D is a detailed view of the contact between elements in section view of the embodiment shown in FIG. 2C.

Still referring to FIGS. 2B-2D, the electrical contact subassembly 260 of rotating element 210 may be axially aligned along axis 230 and configured to mate with the electrical contact subassembly 250 of the static element 220 (FIGS. 2B and 2C). The electrical contact subassembly 260 of the rotating element 210 (FIGS. 2B and 2C) may include a PCB 261 or like substrate that may contain electrical contact features 262 comprising two or more electrically conductive pins, brushes or like contact points to mate and track along the concentric contact areas 252 of the static element 220. The electrical contact features 262 of electrical contact subassembly 260 may be three electrically conductive pins in a tripodal arrangement as best illustrated in FIG. 2B. The tripodal arrangement of electrical contact features 262 may be advantageous in providing additional stability between and during rotations of the PCB 261 relative to the deformable PCB 251 as they are pressed together as detailed in FIG. 2D. For instance, the center of each electrical contact feature 262 may be equidistant to that of the other electrical contact features 262. The centroid of the tripodal arranged electrical contact features 262 may further align with axis 230 centered through spring 256 (FIG. 2C).

Some deformable PCB embodiments, such as the deformable PCB 300 of FIG. 3 may have traces 310 to communicate signals in lieu of or in addition to a wiring connector such as the wiring connector 157 illustrated in FIGS. 1B and 1C. Such traces 310 may be impedance controlled and connect and travel between electric contact features 320 disposed on the center contact area 330 and travel winding past the radially symmetric arc cuts 340 on the PCB material of the deformable section 350 and out to the edge of PCB 300. The electrical pathway may continue with wiring or like electric contacts onto the slip ring and/or the device containing the slip ring embodiment.

Further slip ring embodiments in keeping with the present disclosure may forgo the use of a deformable PCB as described herein and instead include an alignment element to ensure proper alignment between contact of the rotating and static elements of the slip ring.

Turning to FIG. 4A, such a slip ring embodiment 400 in keeping with the present disclosure is illustrated having a rotating element 410 and a static element 420. The rotating element 410 may, in use, rotate relative to the static element 420 about shared axis 430 while communicating power and data signals between the rotating element 410 and static element 420.

Turning to FIGS. 4B and 4C, the slip ring 400 may include an electrical contact assembly 440 to communicate power and data signals between the rotating element 410 and static element 420. The electrical contact assembly 440 may include a rotating electrical contact subassembly 450 and static electrical contact subassembly 460 wherein the rotating electrical contact subassembly 450 is disposed in the rotating element 410, and static electrical contact subassembly 460 is disposed in the static element 420.

Still referring to FIGS. 4B and 4C, the rotating electrical contact subassembly 450 may have a PCB 451 having a number of electrical contact features 452. As illustrated, the electrical contact features 452 include three electrically conductive pins in a tripodal arrangement as best illustrated in FIG. 4B. In other embodiments in keeping with the present invention, the electrical contact features 452 may include a different number of conductive pins, brushes, contact points, or other similar conductive elements to physically make contact with contacts on the opposite elements subassembly. The PCB 451 may be kept in alignment with axis 430 via alignment element 454 (FIG. 4C). The alignment element 454 (FIG. 4C) may prevent lateral side to side movements of the PCB 451 and electrical contact features 452 thereon while permitting outward/inward movements of PCB 451 along axis 430. The PCB 451 and electrical contact features 452 may generally have a force along axis 430 towards the static element 420 via spring 457. A limiting element 456 may prevent the spring 457 and PCB 451 from overextending and therefore keep them intact to the rotating element 410 when the rotating element 410 and static element 420 are not mated together. A wiring connector 458, which may be impedance controlled, may couple to PCB 451 to communicate power and/or data signals to PCB 451 and to electrical contact features 452 thereon.

Still referring to FIGS. 4B and 4C, the static element 420 may include static electrical contact subassembly 460 axially aligned along axis 430 and configured to mate with the rotating electrical contact subassembly 450 of the rotating element 410. The static electrical contact subassembly 460 of the static element 420 may include a PCB 461 or like substrate that may contain concentric contact areas 462 (FIG. 4B). The concentric contact area may, in assembly, align to and contact electrical contact features 452 of the rotating electrical contact subassembly 450 disposed in rotating element 410. The tripodal arrangement of electrical contact features 452 disposed on rotating electrical contact subassembly 450 may add in stability between rotating element 410 and static element 420 during rotations versus other quantities of electrical contact features in other slip ring embodiments. The electrical contact features 452 may remain in contact with the concentric contact areas 462 (FIG. 4B) during rotations of the rotating element 410. For instance, as the rotating element 410 and static element 420 are mated together, the spring 457 of rotating electrical contact subassembly 450 may press into and hold the electrical contact features 452 to concentric contact areas 462 (FIG. 4B) of the static electrical contact subassembly 460. Each pin or like contact point of the electrical contact features 452 may track along respective circular contacts of the concentric contact areas 462 (FIG. 4B) during rotations of the rotating element 410 facilitating the communication of signals between the rotating element 410 and static element 420. It may be noted that two of the three tripodal pins or contact points of the electrical contact features 452 may contact and track along the same concentric contact on the concentric contact areas 462 (FIG. 4B). In other embodiments, the various pins or other contact points may be redundant and contact and track along a shared circular contact area of the concentric contact area or may each contact and track along separate circular contacts of the concentric contact area.

The various slip ring embodiments of the present disclosure may be included in a drum reel as used to store and dispense push cable in pipe inspection systems. As illustrated in FIG. 5, a pipe inspection system 500 may include a drum reel 510 having a slip ring in keeping with the present disclosure. The drum reel 510 may have a rotating element to store and dispense a push cable 520 as well as a static element to which power and data signals may be communicated, such as the connected camera control unit (CCU)

530. For instance, the CCU 530 may display images as well as other data generated by a camera head 540 disposed on the distal end of push cable 520, corresponding to scenes from inside pipe 550 or like inspection area which may require the communication of data to and from camera head 540, through push cable 520, through the slip ring in drum reel 510, and to/from CCU 530. Likewise, power may be transmitted from a battery 560 or other power source coupled to CCU 530 or other, generally stationary, location on the drum reel 510 and onto push cable 520 and camera head 540 via the slip ring in the drum reel 510. It is noted that drum reel 510 may include slip ring elements that may be configured to rotate and other slip ring elements configured to remain static. The rotating and static slip ring elements may secure to the rotating and static portions of the drum reel 510. For instance, the drum reel 510 may have an outer casing 512 that remains stationary relative to an inner drum configured to rotate to dispense or store push cable 520. In a slip ring in keeping with the present disclosure, the static element may couple to the static portion of drum reel 510 while the rotating element may couple to the rotating portion of the drum reel 510. The coupling of rotating and static elements of the slip ring may likewise occur so as to allow the contact features on each to contact in proper alignment and remain in contact during rotations.

Turning to FIGS. 6A and 6B, a drum reel 600 may be or share aspects of drum reel 510 of FIG. 5. The drum reel 600 may have a slip ring assembly 610 to communicate power and data signals between rotating and static portions of the drum reel 600. The slip ring assembly 610 may include a rotating subassembly 620 (FIG. 6B) and a static subassembly 630 (FIG. 6B) corresponding and coupled to rotating and static portions of the drum reel 600.

Turning to FIG. 7, the rotating subassembly 620 may couple to a rotating drum portion 720 while the static subassembly 630 may couple to a static drum portion 730. For instance, the rotating subassembly 620 may include a hub 740 and hub retainer 745 which may secure to rotating drum portion 720 via a number of screws 722. It may be noted that a push cable termination 746 may be formed along a portion of the hub retainer 745 to facilitate connection to a push cable such as push cable 750. The static subassembly 630 may be formed with a cylindrical body portion 632 dimensioned to fit into the hub 740. Furthermore, the static subassembly 630 may include a number of keying features 634 (FIG. 10) which may mate to static drum portion 730, which remains stationary relative to the rotating drum portion 720 and associated rotating subassembly 620 of slip ring assembly 610. The keying features 634 (FIG. 10) of static subassembly 630 may allow for the user to readily attach or detach the rotating subassembly 620 and static subassembly 630. The push cable 750 may be stored wrapped about the rotating drum portion 720 inside drum reel 600 when not in use. Upon use, the rotating drum portion 720 may rotate and pay in or pay out the push cable 750.

Figure 8:
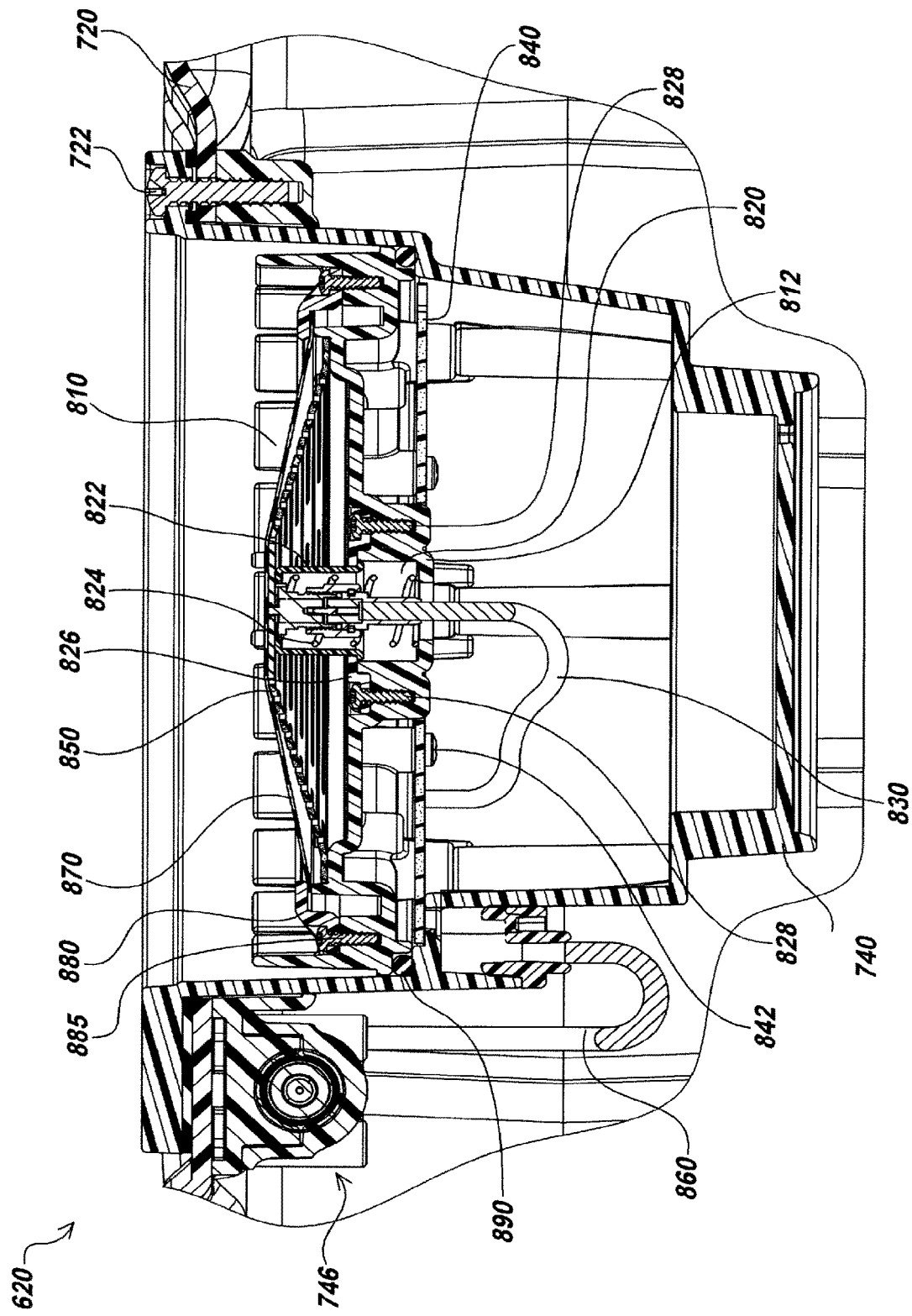
FIG. 8 is a detail of the rotating assembly as shown in the section view of FIG. 7.

Turning to FIG. 8, a detailed view of the rotating subassembly 620, with the static subassembly 630 (FIGS. 6A-7) removed, is illustrated. The rotating subassembly 620 may include a PCB mount 810 which may fit inside the top portion of the hub 740 and secure thereto through screws (not illustrated) or the like. The PCB mount 810 may be formed with a central compartment feature 812 into which a spring element assembly 820 may secure. The spring element assembly 820 may further include a forward pusher element 822 which, in combination with the central compartment feature 812, may contain a spring 824 inside. A pusher retaining ring 826 may secure about forward pusher element 822 and to the PCB mount 810 via screws 828 such that the spring loaded forward pusher element 822 may fit through pusher retaining ring 826 and move along a central axis but catch along a bottom lip on forward pusher element 822. An impedance controlled wiring connector 830 may seat inside spring 824 establishing an electrical connection between an annular PCB 840 secured along the bottom of PCB mount 810 via screws 842 and an elastically deformable PCB 850 secured to the top of PCB mount 810 by screws (not illustrated). An additional electrical connection may be established via connector 860 connected between the annular PCB 840 and the push cable termination 746. The wiring connector 830 may be of sufficient length to permit the outward and inward movements along the central axis of rotating subassembly 620. During such outward and inward movements along the central axis, the deformable PCB 850 may deform in an axial direction towards, and further press into, the static subassembly 630 (FIGS. 6A-7) when attached.

Figure 9:
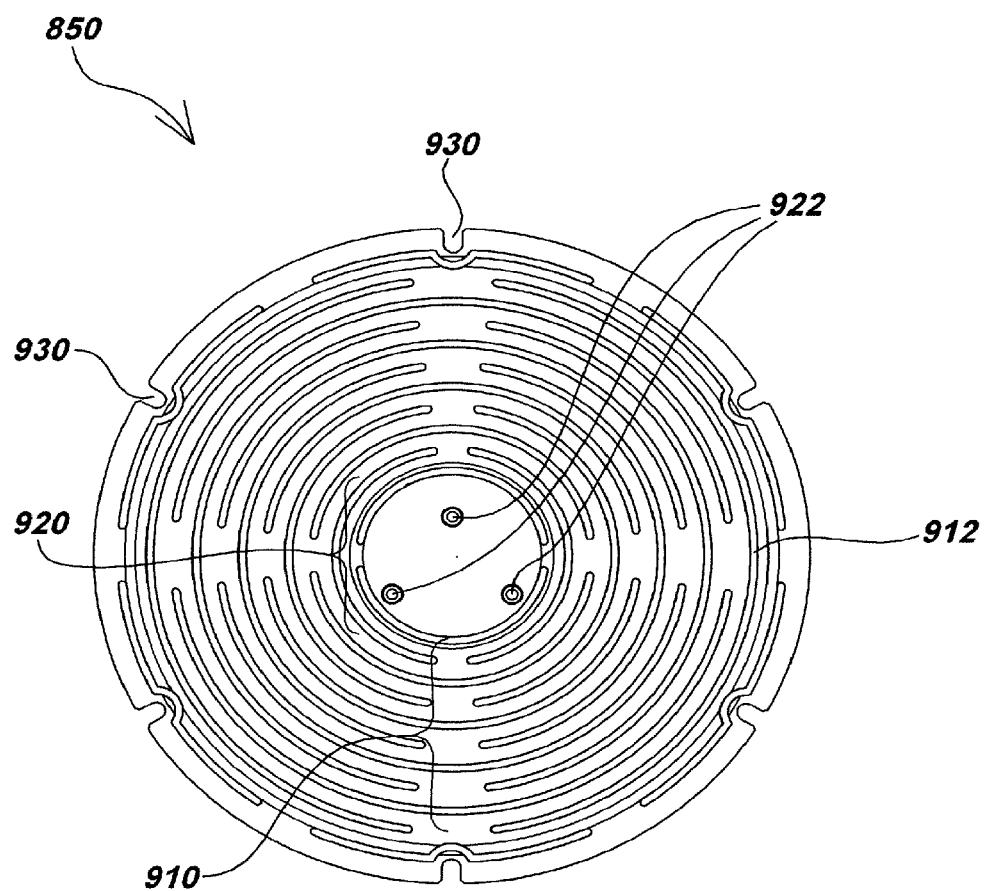
FIG. 9 is a detailed top down view of a deformable PCB embodiment from the rotating assembly.

Turning to FIG. 9, a detailed top down view of the deformable PCB 850 is illustrated. The deformable PCB 850 may include an elastically deformable section 910 surrounding a center contact area 920 allowing the deformable PCB 850 to deform along a center axis towards the other subassembly contact areas when a force is applied to the back of center contact area 920, such as that which may be provided by spring element assembly 820 (FIG. 8) in assembly. The deformable section 910 may be formed with a series of radially symmetric arc cuts 912 surrounding the center contact area 920. The center contact area 920 may include a multitude of electrical contact features such as tripodal conductive pins 922. The conductive pins 922 may comprise silver graphite or like conductive material(s). The tripodal arrangement of pins 922 may add to stability in contact and tracking along the appropriate conductive elements of static subassembly 630 (FIG. 6). The deformable PCB 850 may further include a series of notches 930 formed along the circumference allowing PCB 850 to be secured to PCB mount 810 (FIG. 8) via a series of screws (not illustrated).

Turning back to FIG. 8, a gasket 870 may cover the outward facing side of the deformable PCB 850, allowing the tripodal conductive pins 922 to pass through. Gasket 870 may guard against the ingress of water and dirt into hub 740. The gasket 870 may be clamped in place via an annular gasket retaining ring 880 further secured to PCB mount 810 via screws 885. The rotating subassembly 620 may further include one or more other like gaskets or o-rings, such as o-ring 890, situated to further prevent the ingress of water and/or dirt.

Figure 10:
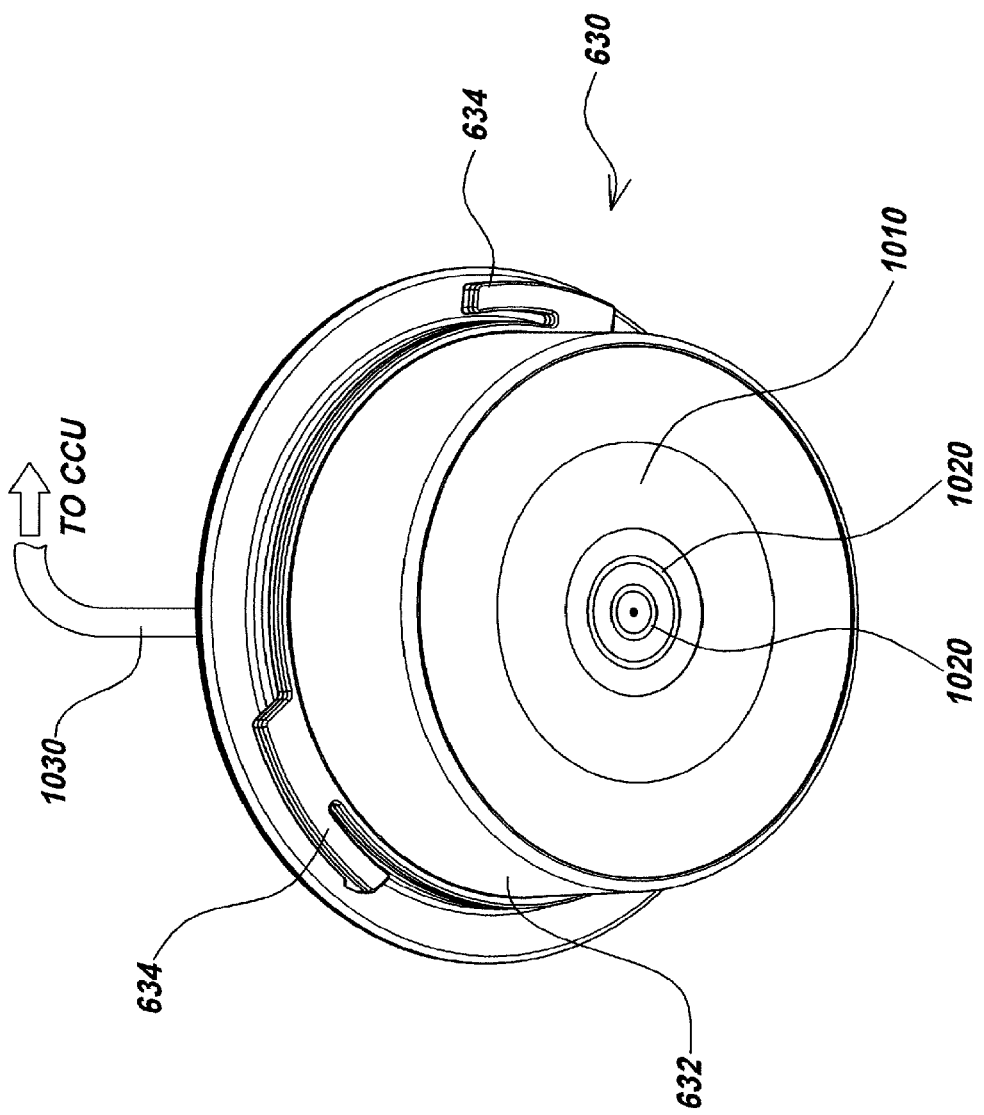
FIG. 10 is an isometric view of a static subassembly embodiment.

Turning to FIG. 10, the static subassembly 630 may have a contact area 1010 with a series of concentric contacts 1020. The concentric contacts 1020 may electrically connect with a wiring connector 1030 which may further connect to a CCU or like device.

Figure 11A:
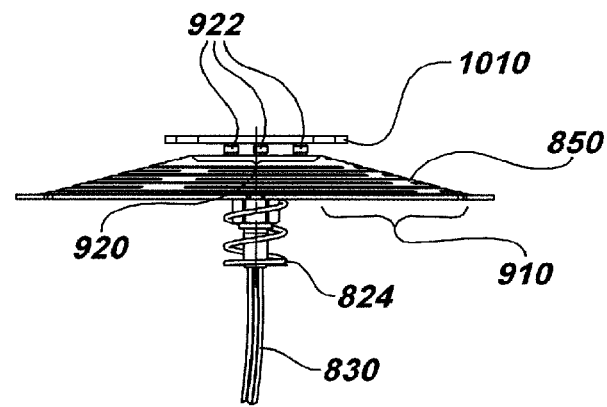
FIG. 11A is a detailed view of contacts between a deformable PCB embodiment of respective rotating and static elements of a slip ring.
Figure 11B:
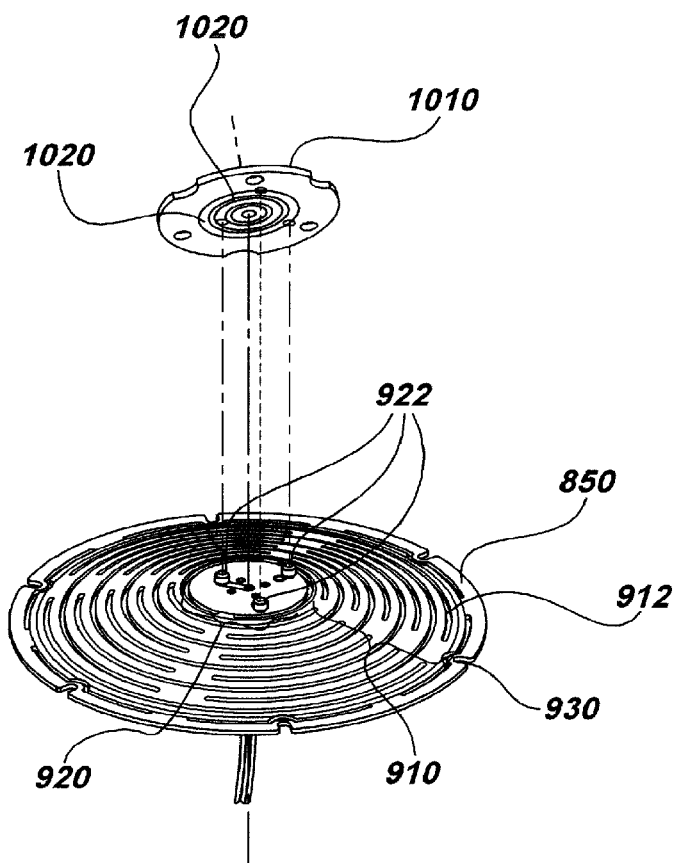
FIG. 11B is a partially exploded view illustrating points of contact between a deformable PCB of respective rotating and static elements.

Turning to FIGS. 11A and 11B, the contact pins 922 disposed on the deformable PCB 850 may align with and press into concentric contacts 1020 (FIG. 11B) allowing the communication of power and data signals. For instance, two of the three tripodal conductive pins 922 may align and contact a single circular contact of the concentric contacts 1020 (FIG. 11B) while the remaining conductive pin 922 may align and contact a different circular contact of the concentric contacts 1020 (FIG. 11B). The center of each contact pin 922 may be equidistant to that of the other contact pins 922. The centroid of the tripodal arranged contact pins 922 may further align centered through spring 824 (FIG. 11A). Upon rotations, the contact pins 922 on the deformable PCB 850 may track along their respective circular contacts of the concentric contacts 1020 (FIG. 11B) to maintain electrical contacts and thereby communication of power and data signals between the rotating deformable PCB 850 and contact area 1010, and between the slip ring's rotating and static elements such as rotating subassembly 620 and static subassembly 630 of slip ring assembly 610 (FIGS. 6B and 7), and rotating and static portions of a coupled device such as the rotating drum portion 720 and static drum portion 730 of drum reel 600 (FIG. 7).

Those of skill in the art would understand that information and signals, such as analog or video signals, data signals, audio signals, or other information signals may be represented and transmitted using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The scope of the presently claimed invention is not intended to be limited to the aspects shown and described previously herein, but should be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein but is to be accorded the widest scope consistent with the following claims and their equivalents.

The invention claimed is:

1. A video pipe inspection system including a drum reel, a push cable, and a slip ring, the slip ring comprising:
    a rotating element;
    a static element; and
    an electrical contact assembly coupling the rotating element and static element, the electrical contact assembly comprising two or more axially aligned electrical contact subassemblies, wherein one electrical contact subassembly is disposed in the rotating element and another electrical contact subassembly is disposed in the static element;
    wherein a first of the electrical subassemblies includes an elastically deformable printed circuit board (PCB); and
    a spring element;
    and wherein the slip ring is disposed in a drum reel to communicate power and/or data signals between a rotating portion of the drum reel to pay in and out a push cable, and a stationary portion that couples to a camera control unit or other static element.

2. The slip ring of claim 1, wherein the spring element is elastically deformable.

3. The slip ring of claim 2, wherein the PCB is flat when in a resting state.

4. The slip ring of claim 1, wherein the PCB is flat when in a resting state.

5. The slip ring of claim 4, further including an impedance controlled wiring connector coupled to the PCB to communicatively couple electrical signals with a predetermined impedance (Original).

6. The slip ring of claim 4, wherein the PCB includes one or more impedance controlled traces in a circuit board section of the radially symmetric arc cut out portion of the PCB surrounding the center contact area.

7. The slip ring of claim 1, wherein the electrical contact subassemblies include two or more conductive pins that align to contact and remain in contact in rotations with concentric contact areas on a second of the electrical contact subassemblies.

8. A slip ring for transferring electrical signals between rotating and static elements of a device, comprising:
    a rotating element;
    a static element; and
    an electrical contact assembly coupling the rotating element and static element, the electrical contact assembly comprising two or more axially aligned electrical contact subassemblies, wherein one electrical contact subassembly is disposed in the rotating element and another electrical contact subassembly is disposed in the static element;
    wherein a first of the electrical subassemblies includes an elastically deformable printed circuit board (PCB); and
    a spring element;
        wherein the electrical contact subassemblies include electrical contact features and the electrical contact features include three conductive pins in a tripodal arrangement.

9. The slip ring of claim 8, wherein each of the tripodal conductive pins are centered equidistant from that of the other pins.

10. The slip ring of claim 8, wherein the tripodal conductive pins are positioned such that a centroid of the conductive pins is in alignment with a center of the spring element.

11. The slip ring of claim 8, wherein the electrical contact features of one electrical contact subassembly include silver graphite pins.

12. A video pipe inspection system, comprising:
    a drum reel and a slip ring, the slip ring comprising:
        a rotating element;
        a static element; and
        an electrical contact assembly coupling the rotating element and static element, the electrical contact assembly comprising two or more axially aligned electrical contact subassemblies,
        wherein one electrical contact subassembly is disposed in the rotating element and another electrical contact subassembly is disposed in the static element;
        and wherein a first of the electrical subassemblies includes a printed circuit board (PCB);
        and wherein the slip ring is disposed in a drum reel to communicate power and/or data signals between a rotating portion of the drum reel to pay in and out a push cable, and a stationary portion that couples to a camera control unit or other static element.

13. The system of claim 12, wherein the spring element is elastically deformable.

14. The system of claim 12, wherein the electrical contact subassemblies include two or more conductive pins that align to contact and remain in contact in rotations with concentric contact areas on a second of the electrical contact subassemblies.

15. The system of claim 12, wherein the electrical contact subassemblies include electrical contact features and the electrical contact features include three conductive pins in a tripodal arrangement.

16. The system of claim 15, wherein each of the tripodal conductive pins are centered equidistant from that of the other pins.

17. The system of claim 15, wherein the tripodal conductive pins are positioned such that a centroid of the conductive pins is in alignment with a center of the spring element.

18. The system of claim 15, wherein the electrical contact features of one electrical contact subassembly include silver graphite pins.

19. The slip ring of claim 15, further including an impedance controlled wiring connector coupled to the PCB to communicatively couple electrical signals with a predetermined impedance (Original).

20. The system of claim 15, wherein the PCB includes one or more impedance controlled traces in a circuit board section of the radially symmetric arc cut out portion of the PCB surrounding the center contact area.

* * * * *